US012660796B2

(12) United States Patent
La Penna et al.

(10) Patent No.: US 12,660,796 B2
(45) Date of Patent: Jun. 23, 2026

(54) ANIMAL CLEANING DEVICE

(71) Applicant: DIVIA LA PENNA DESIGN STUDIO INC., North York (CA)

(72) Inventors: Divya Sharada La Penna, Toronto (CA); Albert Michael La Penna, Toronto (CA); Steve A. Copeland, Barrie (CA); Nicholas Teixeira, Angus (CA)

(73) Assignee: Divia La Penna Design Studio Inc. (CA)

( * ) Notice: Subject to any disclaimer, the term of this patent is extended or adjusted under 35 U.S.C. 154(b) by 446 days.

(21) Appl. No.: 17/715,295

(22) Filed: Apr. 7, 2022

(65) Prior Publication Data

US 2023/0320322 A1     Oct. 12, 2023

(51) Int. Cl.
A47L 11/34          (2006.01)
A01K 13/00          (2006.01)
(Continued)

(52) U.S. Cl.
CPC .............. A01K 13/001 (2013.01); A47L 5/14 (2013.01); A47L 5/365 (2013.01); A47L 7/0019 (2013.01);
(Continued)

(58) Field of Classification Search
CPC ......... A01K 13/001; A47L 5/14; A47L 5/365; A47L 7/0019; A47L 7/0023; A47L 9/06;
(Continued)

(56) References Cited

U.S. PATENT DOCUMENTS 3,755,850 A * 9/1973 Porter ................. A47L 11/4041
                                                        15/83
3,896,521 A * 7/1975 Parise ................. A47L 11/4044
                                                        15/322
(Continued)

FOREIGN PATENT DOCUMENTS

CN          107455280 A      12/2017
EP            176696 B1 *     4/1989
(Continued)

OTHER PUBLICATIONS

Translation of EP0176696B1 (Year: 1989).*
(Continued)

*Primary Examiner* — Tom Rodgers
(74) *Attorney, Agent, or Firm* — Sand, Sebolt & Wernow Co., LPA

(57) ABSTRACT

A device, attachments, and method for grooming or cleaning the fur of an animal. The device includes a main unit, a steam delivery system operatively engaged with the main unit, and a liquid delivery system operatively engaged with the main unit. The steam delivery system is operable to selectively deliver a quantity of steam to the animal's fur and the liquid delivery system is operable to selectively deliver a volume of liquid to the animal's fur. The steam delivery system and liquid delivery system are selectively independently activated to perform a grooming or cleaning task with the device. One or more attachments are connectable with the main unit via a hose. Some of the attachments include a plurality of tines that extend outwardly in the direction of movement of the attachment along the animal's body and capture and lift hairs for improved application of liquid, shampoo, or air thereto.

14 Claims, 26 Drawing Sheets

(51) Int. Cl.

| | |
|---|---|
| *A47L 5/14* | (2006.01) |
| *A47L 5/36* | (2006.01) |
| *A47L 7/00* | (2006.01) |
| *A47L 9/06* | (2006.01) |
| *A47L 9/08* | (2006.01) |
| *A47L 9/24* | (2006.01) |
| *A47L 11/30* | (2006.01) |
| *A47L 11/40* | (2006.01) |

(52) U.S. Cl.

CPC .............. *A47L 7/0023* (2013.01); *A47L 9/06* (2013.01); *A47L 9/08* (2013.01); *A47L 9/248* (2013.01); *A47L 11/30* (2013.01); *A47L 11/4083* (2013.01); *A47L 11/4086* (2013.01)

(58) Field of Classification Search

CPC . A47L 9/08; A47L 9/248; A47L 11/30; A47L 11/4083; A47L 11/4086; A47L 9/0673; A47L 9/068

See application file for complete search history.

(56) References Cited

U.S. PATENT DOCUMENTS

| | | | | |
|---|---|---|---|---|
| 4,153,968 | A | * | 5/1979 | Perkins .................... B01F 23/45 |
| | | | | 15/321 |
| 4,779,572 | A | | 10/1988 | Freulon |
| 5,513,598 | A | | 5/1996 | Zapparoli |
| 6,453,848 | B1 | | 9/2002 | Hachey |
| 6,651,588 | B1 | | 11/2003 | Penzimer |
| 7,654,228 | B1 | | 2/2010 | Graham et al. |
| D647,260 | S | | 10/2011 | Hollis et al. |
| 9,532,693 | B1 | | 1/2017 | Tran et al. |
| 10,905,101 | B2 | | 2/2021 | Mainini et al. |
| 11,019,803 | B2 | | 6/2021 | Takla et al. |
| 11,083,170 | B2 | | 8/2021 | Moyher, Jr. et al. |
| D948,813 | S | | 4/2022 | Dexter |
| D995,960 | S | | 8/2023 | Lin et al. |
| 11,730,335 | B1 | * | 8/2023 | Resch ................... A47L 11/201 |
| | | | | 15/320 |
| D1,001,392 | S | | 10/2023 | Li |
| D1,002,122 | S | | 10/2023 | Wang |
| D1,002,962 | S | | 10/2023 | Chen |
| D1,036,032 | S | | 7/2024 | Lv |
| D1,043,002 | S | | 9/2024 | Lv |
| D1,062,120 | S | | 2/2025 | Guo |
| 2006/0272120 | A1 | * | 12/2006 | Barrick ................... G01F 23/58 |
| | | | | 15/344 |
| 2010/0192980 | A1 | * | 8/2010 | Turner ............... A47L 11/4083 |
| | | | | 15/328 |
| 2016/0157693 | A1 | * | 6/2016 | Hess ................... A47L 11/4011 |
| | | | | 15/322 |
| 2021/0051921 | A1 | | 2/2021 | Hoffmann et al. |
| 2021/0393102 | A1 | * | 12/2021 | Bian ................... A47L 11/4041 |
| 2023/0210333 | A1 | * | 7/2023 | Fordahl ............... A47L 11/4013 |
| | | | | 15/320 |
| 2023/0240501 | A1 | * | 8/2023 | DeJonge ............... A47L 11/302 |
| | | | | 15/319 |
| 2023/0320322 | A1 | | 10/2023 | La Penna et al. |

FOREIGN PATENT DOCUMENTS

| | | | |
|---|---|---|---|
| KR | | 102063213 B1 | 1/2020 |
| WO | | 2019059465 A1 | 3/2019 |

OTHER PUBLICATIONS

Bissell, Inc.; Bissell Barkbath Dual Use Portable Carpet Deep Cleaner; www.BISSELL.com; 22 Pages.

"Dog Vacuum" available Nov. 14, 2022, [online], [site visited Feb. 13, 2025]. Retrieved from Internet, URL:https://www.amazon.com/kanpets-Grooming-Dustbin-Powerful-Shedding/dp/BOBJ6DP7NC (Year: 2022).

* cited by examiner

ANIMAL CLEANING DEVICE

TECHNICAL FIELD

This disclosure is directed to animal care equipment. More particularly, the present disclosure relates to equipment for grooming or cleaning animals, particularly pets like dogs and cats. Specifically, the present disclosure is directed to a device having both a liquid delivery system and a steam delivery system and therefore enables a person to select whether to wash/shampoo their animal or steam clean their animal based on a level of soil of the fur of the animal. Attachments are provided which are selectively engageable with the liquid delivery system or the steam delivery system. Some of the attachments include a plurality of tines that form a leading end of the attachment and are oriented in a direction of travel of the attachment along the animal's body. The tines are oriented to capture and lift hairs of the fur of the animal away from their skin for more effective washing, steam cleaning, and drying of the fur.

BACKGROUND

One of the more challenging aspects of pet ownership is how to clean a pet when the pet's fur has become dirty. This is particularly challenging for people who have dogs who love to run and play outdoors and land up with muddy, matted fur and filthy paws. While it is possible to take the animal to a groomer or to a pet wash, or to even bathe the animal at home in a tub or shower, not all animals enjoy the experience of being immersed or soaked with water and will actively resist.

It has been proposed by some to provide a device that is able to be used by the pet owner to clean their animal without immersing or soaking the animal in water. For example, U.S. Patent Publication 2021/0061921 (Hoffmann et al) discloses a pet grooming system includes a hand tool coupled to a portable module via a hose. The portable module includes a first tank that is able to be filled with a cleaning liquid. The hose is used to deliver the cleaning liquid to the animal's body via the hand tool. The hand tool is later used to remove the liquid from the animal's fur and the dirtied liquid moves through the hose and is captured in a second tank provided on the portable module. The hand tool is configured to concurrently brush or comb the animal's fur while it is being washed. The hand tool includes a head having bristles extending outwardly from a body-contacting surface of the head. The body-contacting surface of the head is moved along the animal's body, smoothing down and combing the fur as the tool sprays cleaning liquid into the same.

Portable devices similar to those disclosed by Hoffman et al. include devices disclosed in U.S. Pat. No. 10,905,101 (Manini et al.), U.S. Pat. No. 11,083,170 (Moyher, Jr. et al.) and Publication No. WO2019/059465 (Rho et al.), amongst others.

SUMMARY

While the previously-disclosed devices may work adequately for the purpose for which they were intended, they leave only one option for the pet owner, namely to wash their animal. In some instances, the pet is simply not dirty enough to subject them to a full washing experience.

The device disclosed herein provides at least two possible types of cleaning or grooming to be undertaken, one when the pet's fur is quite soiled and the other when the pet's fur is not particularly dirty but instead simply needs "refreshing". The presently disclosed device provides a steam delivery system for use for a quick clean-up refreshing of the fur. The disclosed device also includes a liquid delivery system that provides for a shampoo wash/vacuum for when deep cleaning of the fur is needed.

Previously known systems have typically included vacuum brushes which apply a shampoo mixture to the fur and are drawn in a direction moving from the head of the animal towards the tail of the animal or from a top of the animal's back down towards the animal's paws. The movement of these vacuum brushes tends to flatten the fur against the animal's body and may therefore not provide deep cleaning of the fur. Flattening the fur also makes it harder to vacuum moisture, debris, and loose hairs up with the vacuum head. The fur therefore takes a longer time to dry and debris and loose hairs may be left trapped in the fur. The device disclosed herein includes attachments that are configured to be used in an opposite direction from the cleaning heads of the prior art. The attachments disclosed herein are configured to be moved in a direction from the rear end of the animal towards the animal's head and from the animal's paws upwardly towards the top of the animal's back. The attachments disclosed herein include a comb having tines that point in the direction of intended movement of the attachment's head, i.e., toward the animals head. As the attachment moved in this desired direction, hairs of the fur become captured between adjacent tines of the comb and are lifted away from the animal's skin. The cleaning liquid or cleaning steam is thereby able to penetrate deeper into the fur and give a more thorough cleaning than was possible with prior art devices. Furthermore, when vacuum suction is applied to pull moisture, loose hairs, and particulate materials from the fur of the animal, because the hairs are captured and lifted, the suction reaches deeper into the fur and therefore tends to withdraw more moisture, loose hairs, and debris than would be possible if the hairs were flattened against the animal's skin. Similarly, altering the airflow through the attachment to dry the fur is also more effective with the disclosed attachment because the blown air is able to penetrate deeper into the fur. This lifting of the fur with the disclosed attachment provides the optimum cleaning of the fur and vacuum removal of moisture therefrom.

It should be noted that when the steam delivery system of the disclosed device is activated, the steam emitted by the attachment is directed towards the lifted hairs of the fur and not downwardly towards the animal's skin. This configuration enables the disclosed device to more easily and quickly refresh the fur without the risk of burning the animal's skin with the steam.

In one aspect, an exemplary embodiment of the present disclosure may provide a device for grooming or cleaning the fur of an animal, wherein the device comprises a main unit; a steam delivery system operatively engaged with the main unit and adapted to selectively deliver a quantity of steam to the fur of the animal; a liquid delivery system operatively engaged with the main unit and adapted to selectively deliver a volume of liquid to the fur of the animal; and wherein the steam delivery system and the liquid delivery system are selectively independently activated to perform a grooming or cleaning task with the device.

In one embodiment, each of the steam delivery system and the liquid delivery system may include a tank that is detachably engageable from the main unit. It will be understood that in other embodiments, one or both of the steam delivery system and the liquid delivery system may include a tank that permanently forms an integral part of the main unit and is not detached for filling. In one embodiment, the steam delivery system may comprise a steamer tank provided on the main unit and adapted to hold a volume of water therein; and a heating system in operative engagement with the steamer tank and adapted to heat the volume of water in the steamer tank and generate steam therefrom. In one embodiment, the steam delivery system may further comprise a steamer hose extending outwardly from the steamer tank; and a steamer attachment provided at an end of the steamer hose remote from the steamer tank. In one embodiment, the steamer attachment may include a first surface adapted to be oriented generally parallel to a body of the animal during the grooming or cleaning task; a second surface oriented at an angle to the first surface; and a plurality of tines extend outwardly from the second surface in a direction of movement of the steamer attachment along the body of the animal during the grooming or cleaning task, wherein the plurality of tines comprise a leading end of the steamer attachment. In one embodiment, at least one nozzle may extend outwardly from a third surface of the steamer attachment, wherein the third surface is located remote from the body of the animal during the grooming or cleaning task.

In one embodiment, the liquid delivery system may include a tank provided on the main unit and adapted to hold a quantity of cleaning liquid therein; and an attachment hose operatively engageable with the main unit and selectively placeable in fluid communication with the tank. In one embodiment, the liquid delivery system may further include a pump that is in fluid communication with the tank and the attachment hose may be selectively placed in fluid communication with the pump. In one embodiment, at least one attachment may be selectively operatively engaged with an end of the attachment hose remote from the main unit. The at least one attachment may comprise an attachment for grooming fur. The at least one attachment may further comprise an attachment for cleaning paws.

In one embodiment, the device may further comprise an extraction system operatively engaged with the main unit and adapted to move waste liquid and solid materials away from the animal's body during the grooming or cleaning task. In one embodiment, the extraction system may include a reservoir provided on the main unit; and wherein the device further comprises an attachment hose operatively engaged with the main unit, wherein the attachment hose is selectively placed in fluid communication with the reservoir to deliver the waste liquid and solid materials to the reservoir. In one embodiment, the extraction system further may comprise a blower/vacuum motor housed within the main unit; and the device may further comprise an attachment hose operatively engaged with the main unit and the attachment hose may be selectively placed in fluid communication with the blower/vacuum motor. In one embodiment, the main unit may include a vacuum port and a blower port which are each in fluid communication with the blower/vacuum motor, and the attachment hose may be selectively engageable with the vacuum port to cause air flow in a first direction through the attachment hose. The attachment hose may further be selectively engageable with the blower port to cause air flow in a second direction through the attachment hose.

In another aspect, an exemplary embodiment of the present disclosure may provide an attachment selectively engageable with a device for grooming or cleaning an animal, wherein the attachment comprises a head having a first surface adapted to contact a body of the animal; and a second surface oriented at an angle to the first surface; a shaft extending outwardly from the head in a direction moving away from the second surface, said shaft being adapted to be operatively engaged with the device via an attachment hose; a brush provided on the head, wherein bristles of the brush extend outwardly from the first surface of the head; and a comb provided on the head, said comb including a plurality of tines, wherein the plurality of tines extend outwardly from the second surface of the head in a direction moving away from the shaft and comprise a leading end of the head during a grooming or cleaning task.

In one embodiment, the first surface and the second surface may be oriented at right angles to one another, and the bristles of the brush may be oriented at right angles to the tines of the comb. In one embodiment, at least one chamber may be defined in the head and may extend through the shaft of the attachment, and wherein the at least one chamber may be adapted to be placed in fluid communication with a bore of the attachment hose when the attachment is engaged with the attachment hose. In one embodiment, the at least one chamber may comprise a first chamber and a second chamber; and a nozzle may be provided on the head and be placed in fluid communication with the first chamber; and wherein a shampoo hose may extend through the first chamber and be placed in fluid communication with the nozzle. In one embodiment, the attachment may further comprise an aperture defined in the first surface of the head, wherein the aperture may be in fluid communication with the second chamber; wherein the bristles of the brush may extend through the aperture and project for a distance outwardly beyond the first surface; and wherein air may flow through the aperture and past the bristles and move between the second chamber and air surrounding the head of the attachment.

In another aspect, and exemplary embodiment of the present disclosure may provide a method of grooming or cleaning an animal comprising selecting one of washing the fur of the animal and steaming the fur of the animal; individually activating a liquid delivery system on a device for grooming or cleaning the animal if the selection involves washing the fur of the animal; and individually activating a steam delivery system on the device if the selection involves steaming the animals fur.

In one embodiment, the method may further comprise engaging an attachment hose to a main unit of the device if the selection involves washing the fur of the animal; placing the attachment hose in fluid communication with the liquid delivery system; selecting to engage a first attachment to the attachment hose if the fur on the body of the animal is to be washed; and selecting to engage a second attachment to the attachment hose if the animal's paws are to be washed. In one embodiment, the method may further comprise providing a head on the first attachment; placing a first surface of the head in close proximity to the animal's body; moving the head of the first attachment in a direction of movement away from the animal's tail and towards the animal's head or away from the animal's paws and towards a top of the animal's back; extending a plurality of tines outwardly from a second surface of the head of the first attachment in the direction of movement of the head of the first attachment along the animal's body, wherein the second surface of the head of the first attachment is oriented at an angle to the first surface thereon, and wherein the plurality of tines form a leading end of the head of the first attachment when moving the same along the animal's body. In one embodiment, the method may further comprise capturing hairs of the fur of the animal between adjacent tines of the plurality of tines; lifting the captured hairs away from the animal's skin as the head of the first attachment is moved therealong; delivering a cleaning liquid onto to the captured and lifted hairs from at least one nozzle provided on the head of the first attachment. In one embodiment, the method may further comprise working the cleaning liquid into the fur of the animal and to the skin of the animal with a brush extending outwardly from the first surface of the head of the first attachment as the head moves along the animal's body. In one embodiment, the method may further comprise vacuuming waste cleaning liquid, loose hairs, and particulate materials from the fur of the animal through an aperture defined in the first surface of the head of the first attachment; transporting the waste cleaning liquid, loose hairs, and particulate materials entrained in an airflow through the attachment hose in a first direction moving towards the main unit; and depositing the waste cleaning liquid, loose hairs, and particulate materials into a reservoir provided on the device.

The method may further comprise engaging a steamer hose to a steamer tank provided on the main unit of the device if the selection involves steaming the fur of the animal; placing a steamer attachment on an end of the steamer hose remote from the steamer tank; heating a quantity of water in the steamer tank with a heating system; generating steam in the steamer tank; and delivering the steam to the fur of the animal through the steamer hose and steamer attachment. In one embodiment, the method may further comprise providing a head on the steamer attachment; placing a first surface of the head of the steamer attachment in close proximity to the animal's body; moving the head of the steamer attachment in a direction away from the animal's tail and towards the animal's head or away from the animal's paws and towards a top of the animal's back; extending a plurality of tines outwardly from a second surface of the head of the steamer attachment and in the direction of movement of the head of the steamer attachment along the animal's body, wherein the second surface on the head of the steamer attachment is oriented at an angle to the first surface thereof, and wherein the plurality of tines form a leading end of the head of the steamer attachment as the head is moved along the animal's body. In one embodiment, the method may further comprise capturing hairs of the fur of the animal between adjacent tines of the plurality of tines; lifting the captured hairs away from the animal's skin as the head of the steamer attachment is moved along the animal's body; and delivering the quantity of steam to the captured and lifted hairs from at least one nozzle extending upwardly away from a third surface of the head of the steamer attachment and outwardly away from the animal's body.

BRIEF DESCRIPTION OF THE SEVERAL
VIEWS OF THE DRAWINGS

Sample embodiments of the present disclosure are set forth in the following description, are shown in the drawings and are particularly and distinctly pointed out and set forth in the appended claims.

Figure 1:
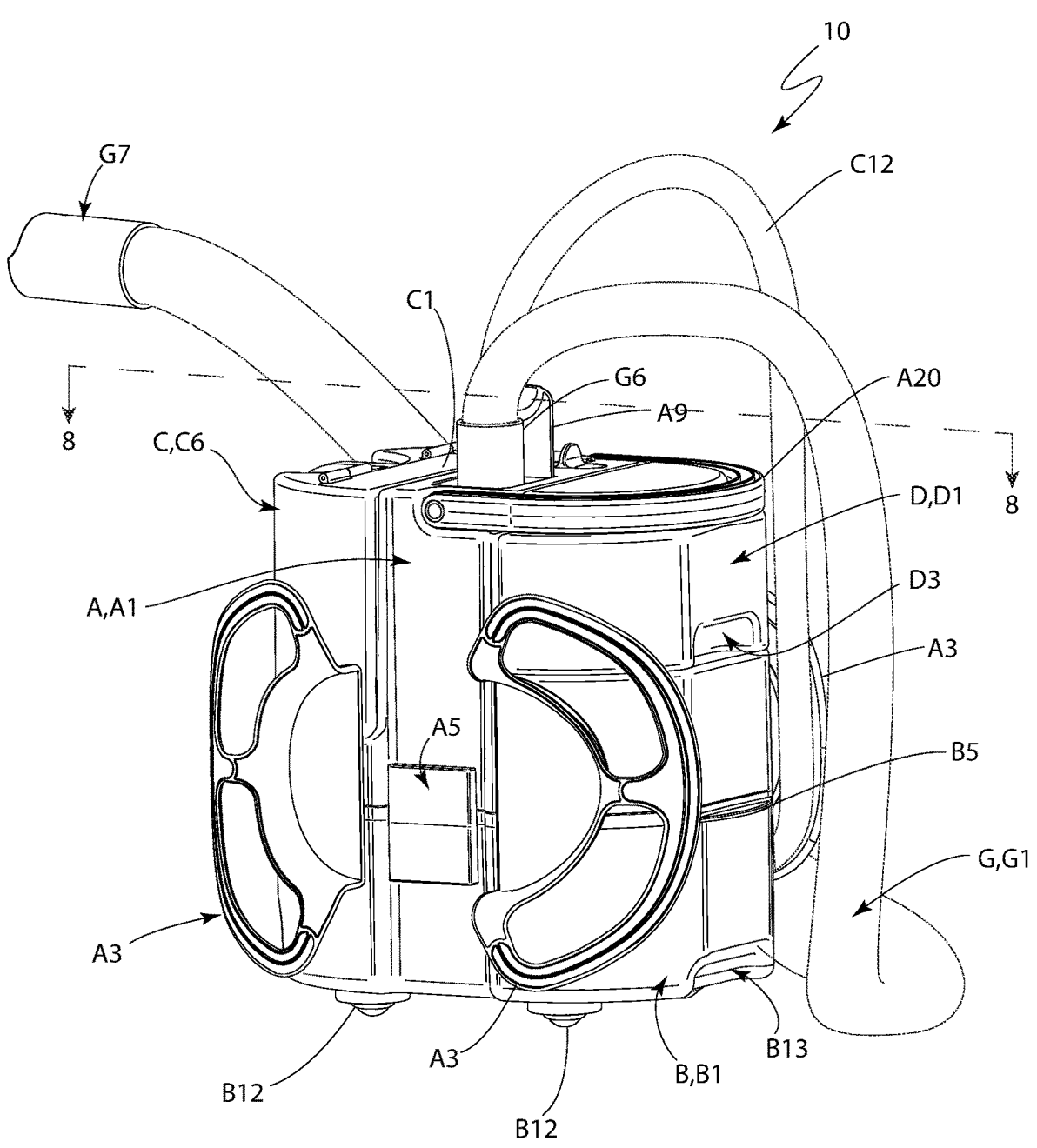
FIG. 1 is a front, top, right side perspective view of a grooming and cleaning device for an animal in accordance with the present disclosure shown with an attachment hose engaged with a body of a main unit of the device via a first attachment port.
Figure 3A:
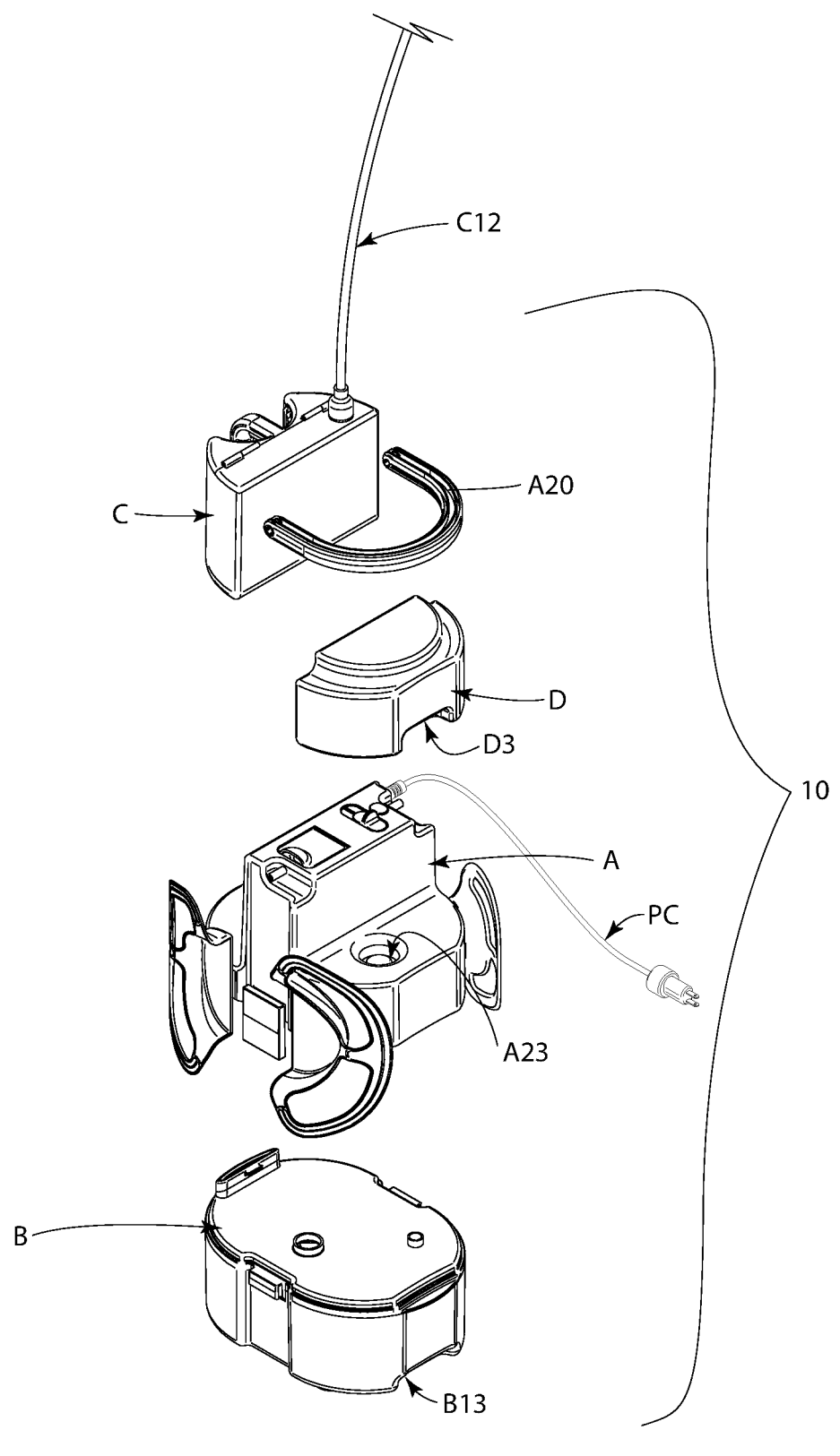
FIG. 3A is an exploded front, top, right side perspective view of the device of FIG. 1 with the attachment hose omitted therefrom.
Figure 3B:
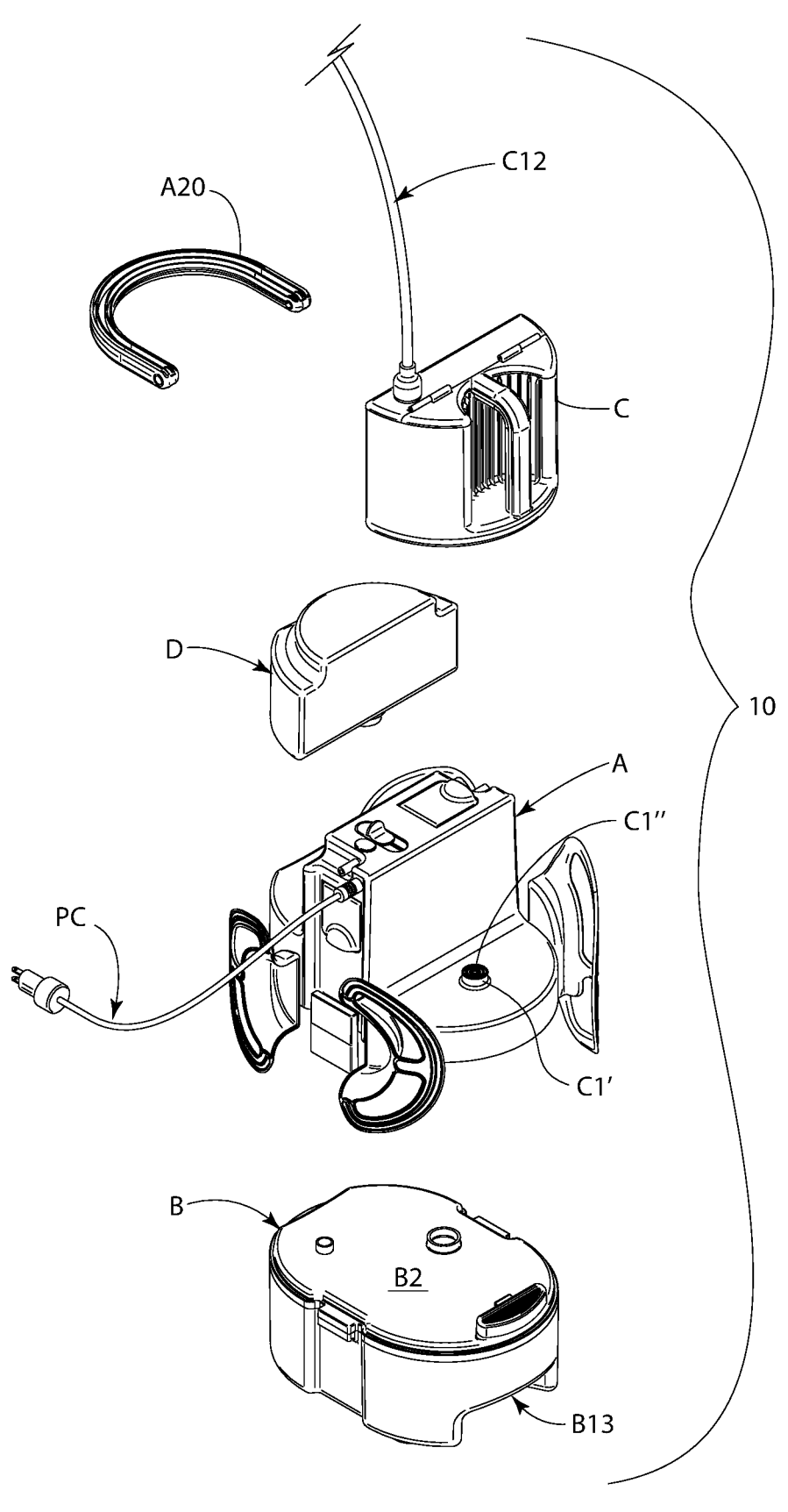
Figure 4:
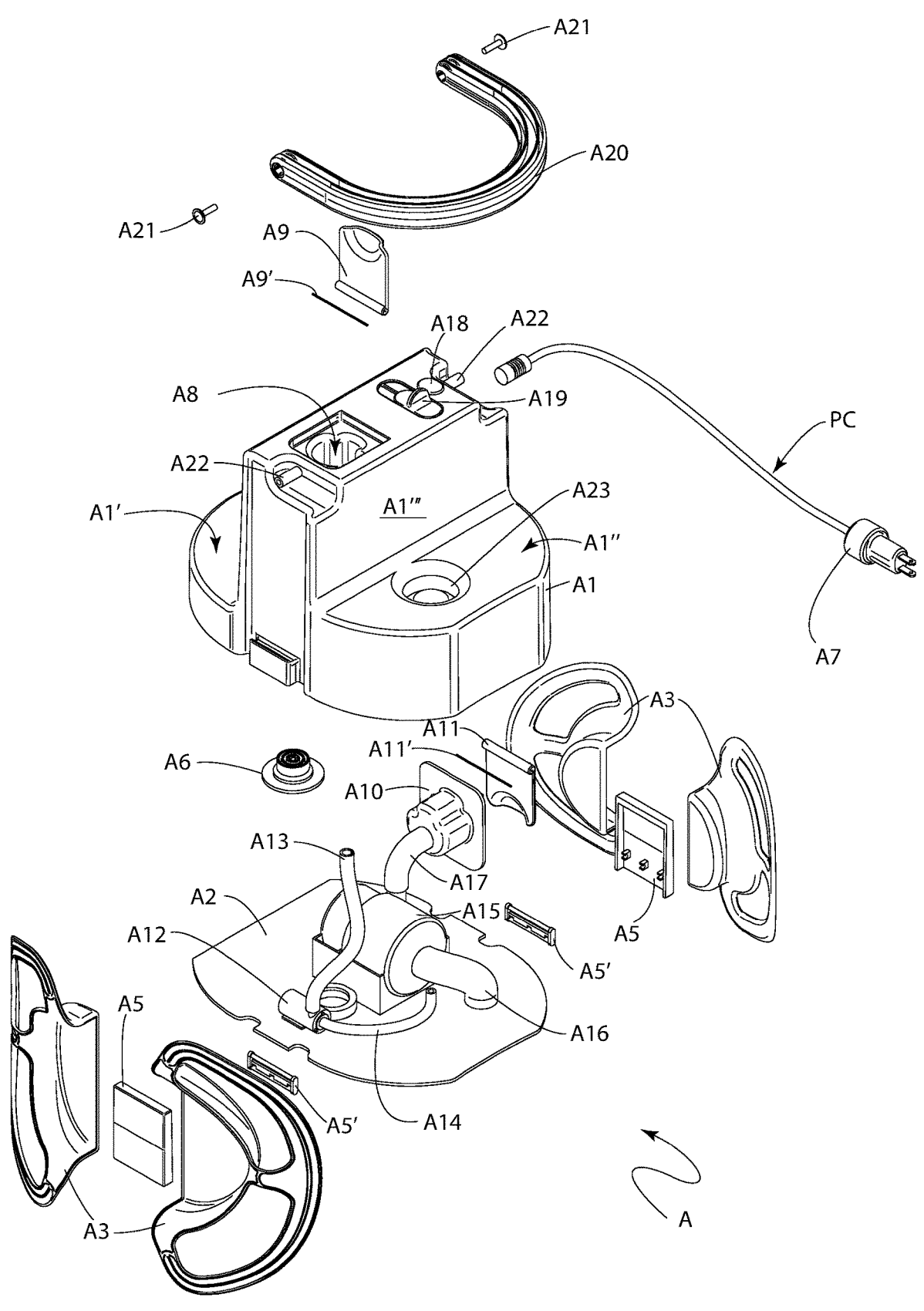
Figure 5:
Figure 6:
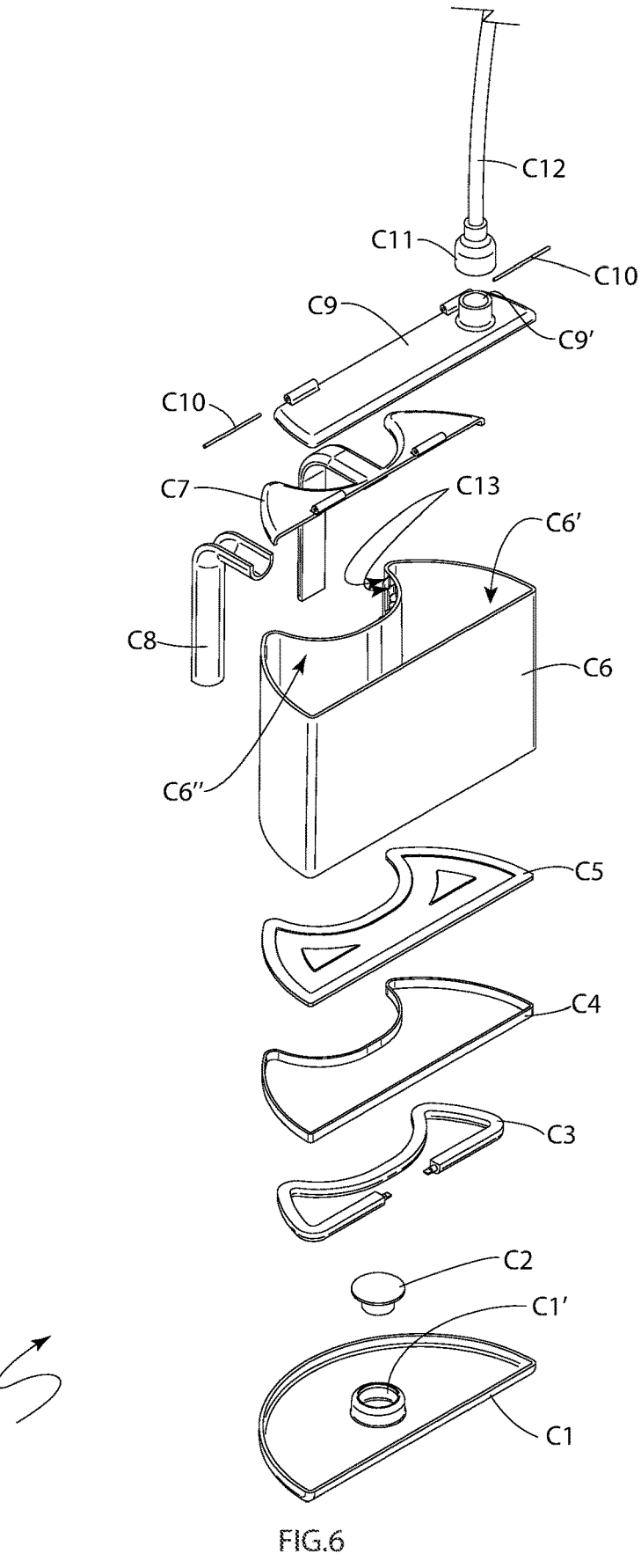
Figure 7:
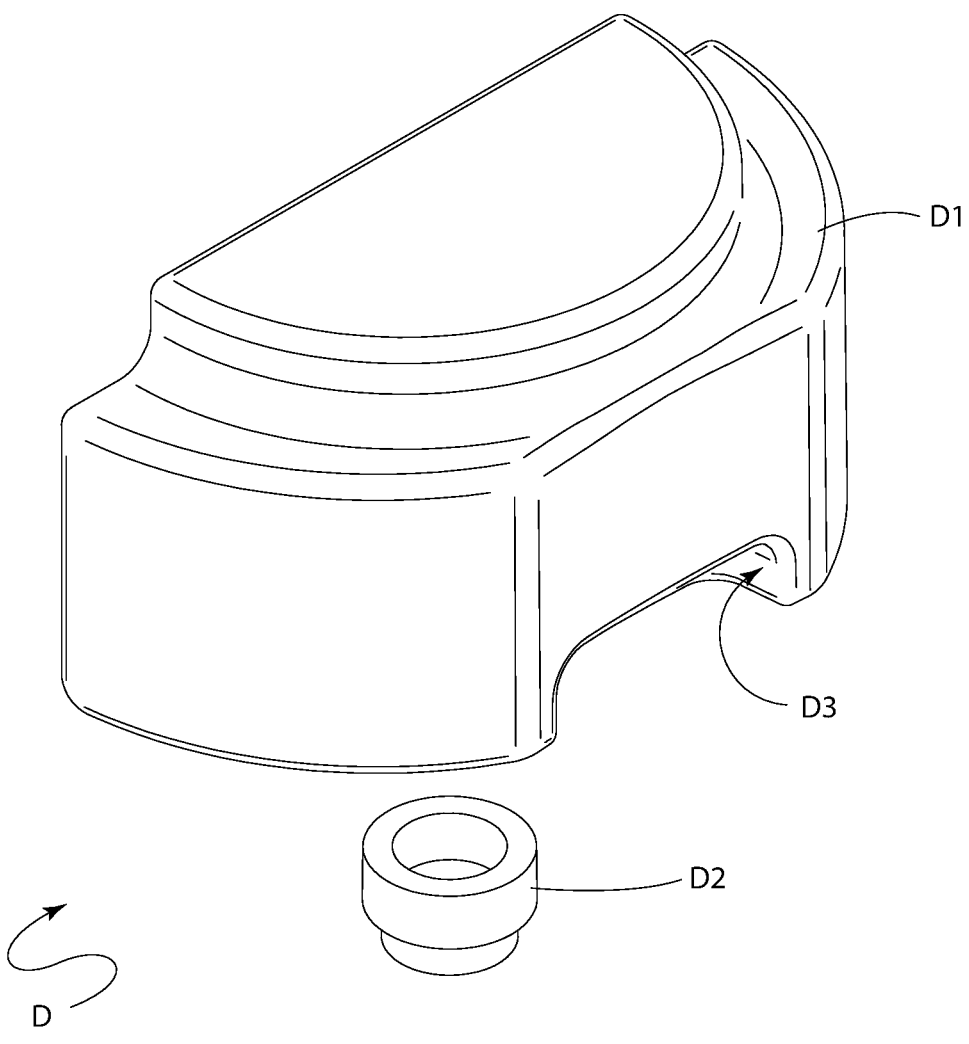
Figure 8:
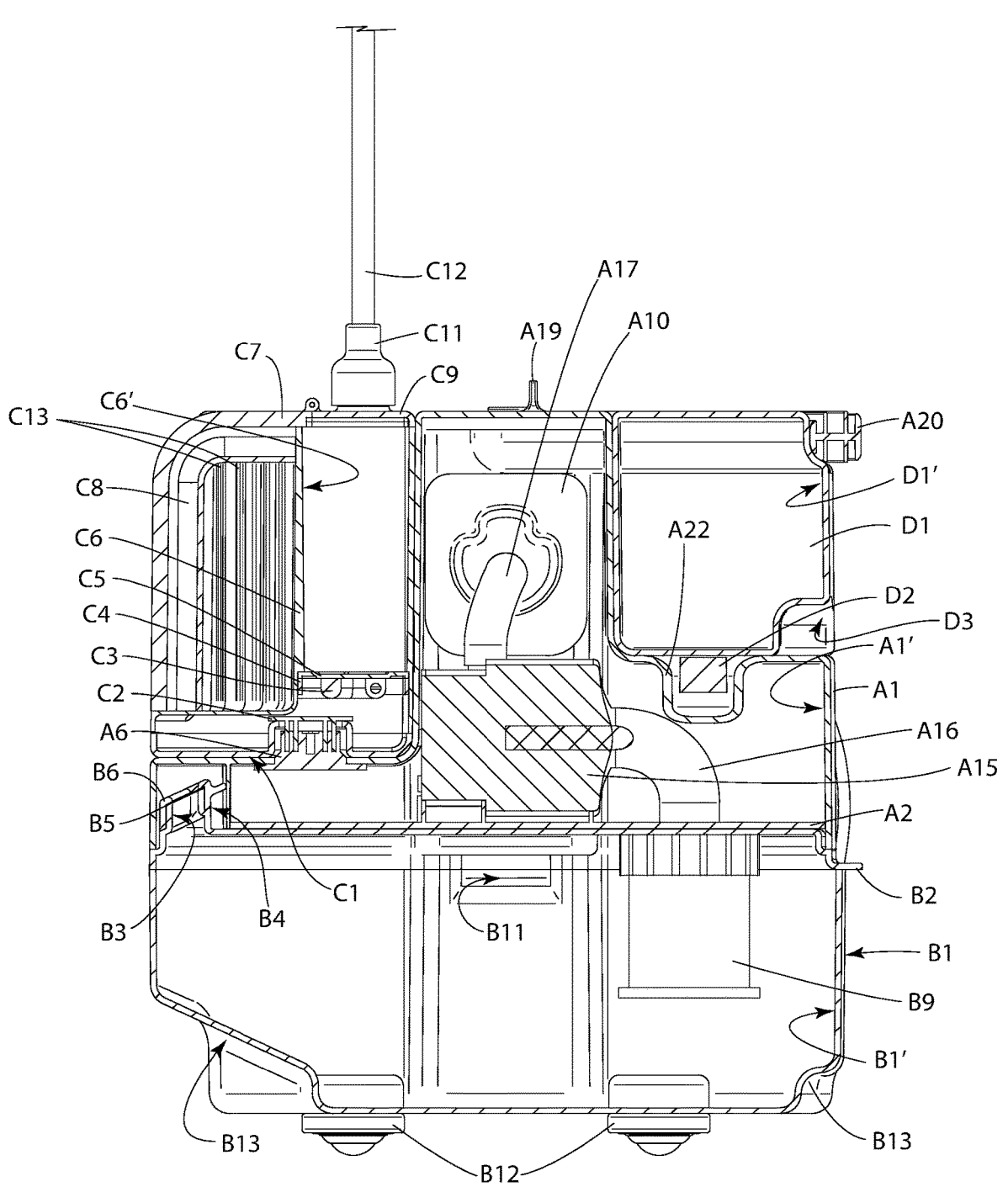
Figure 9:
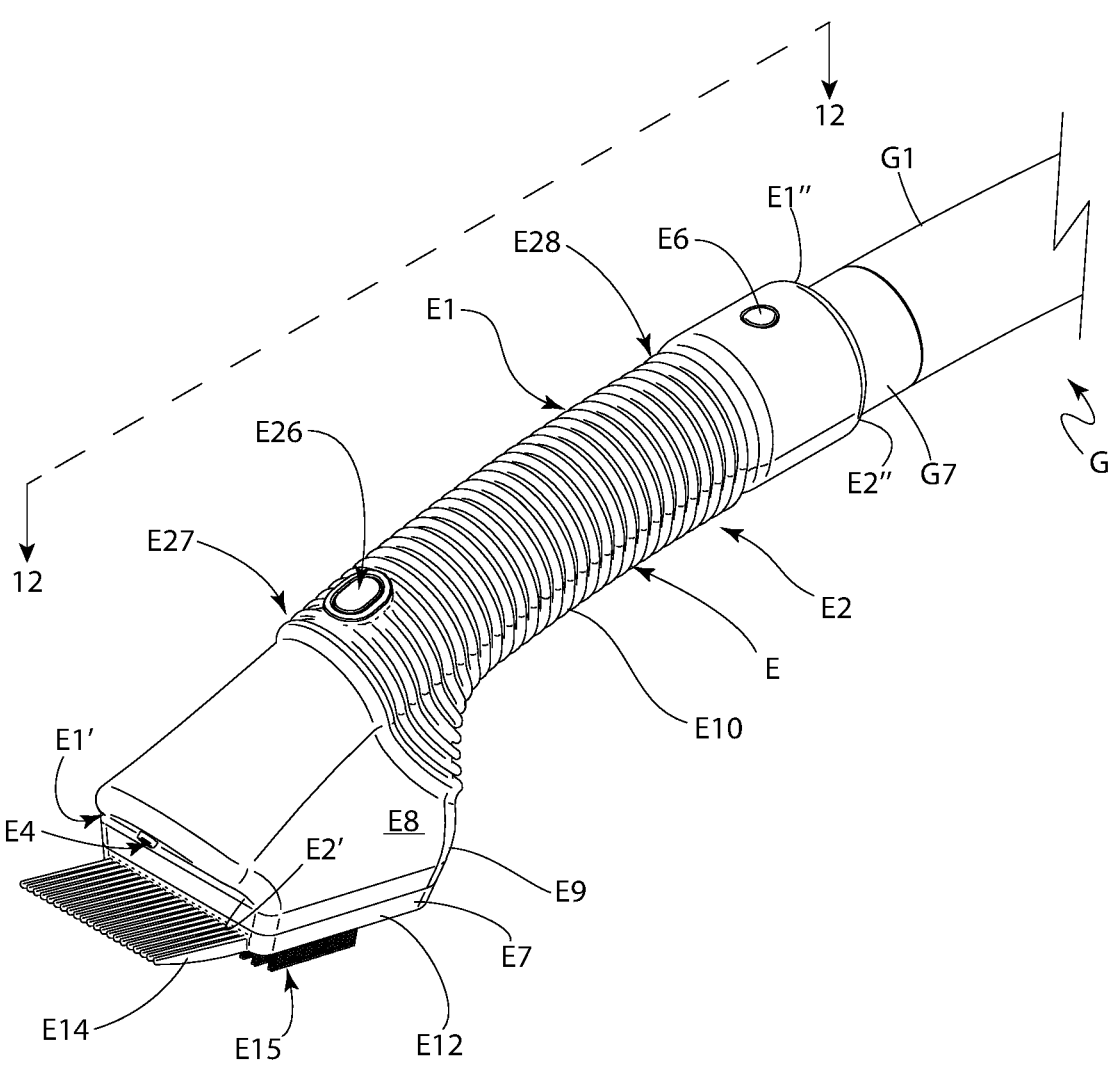
Figure 10:
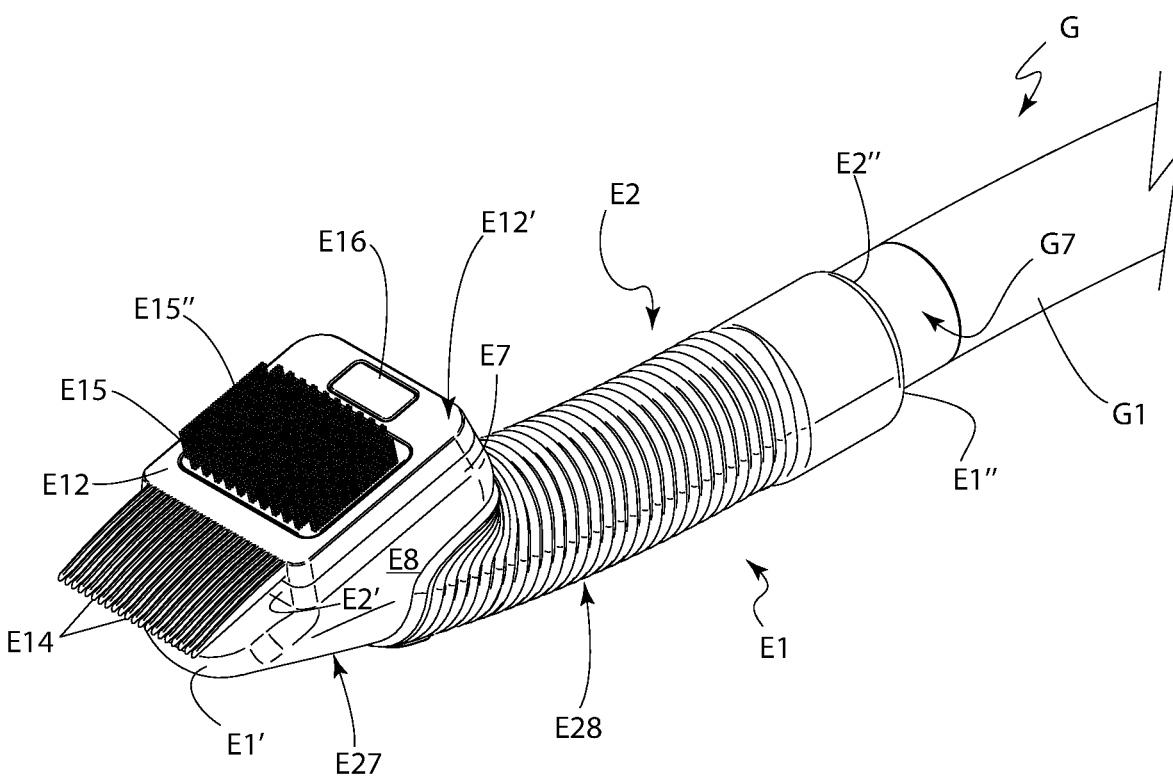
Figure 11:
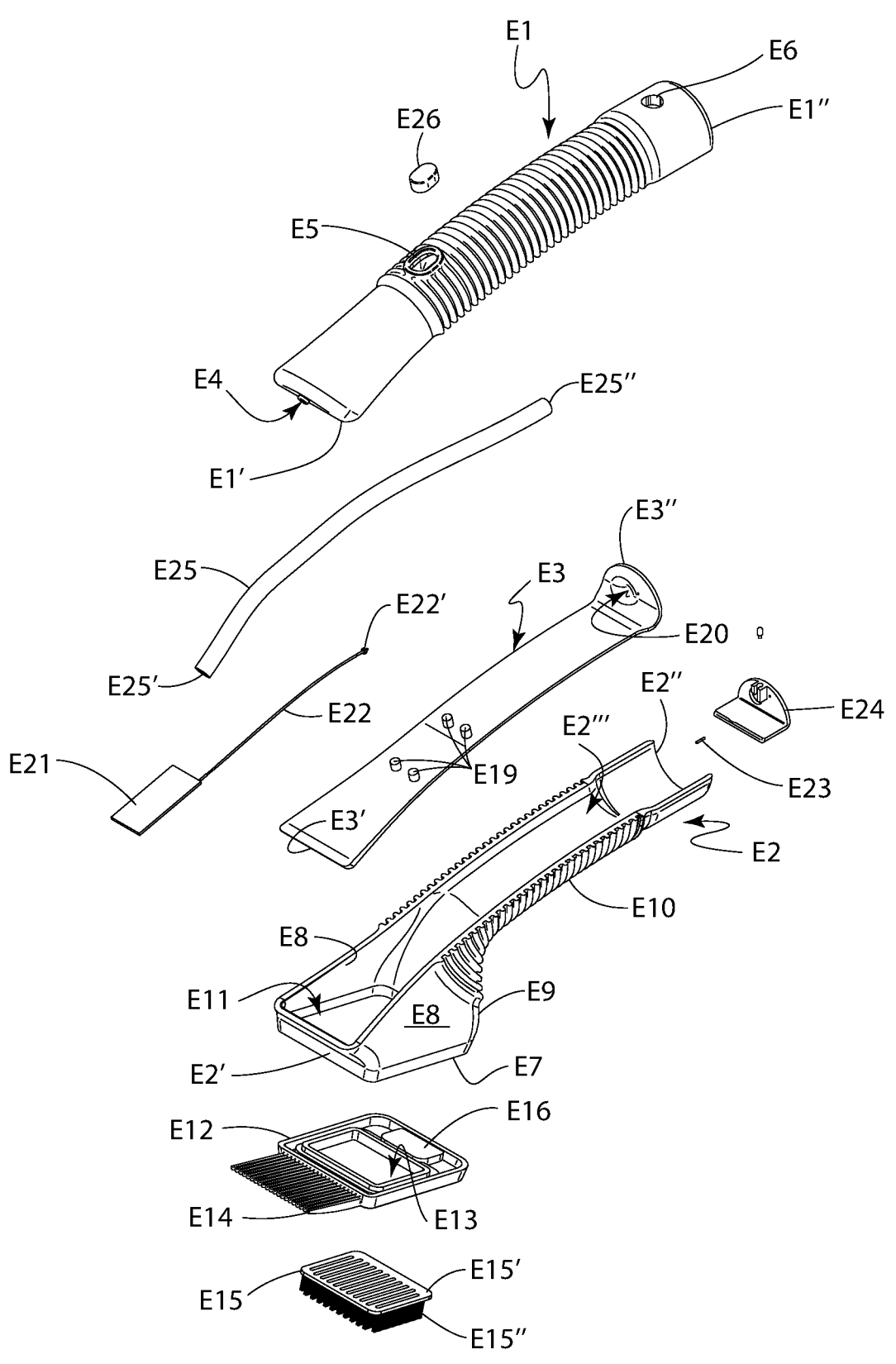
Figure 12:
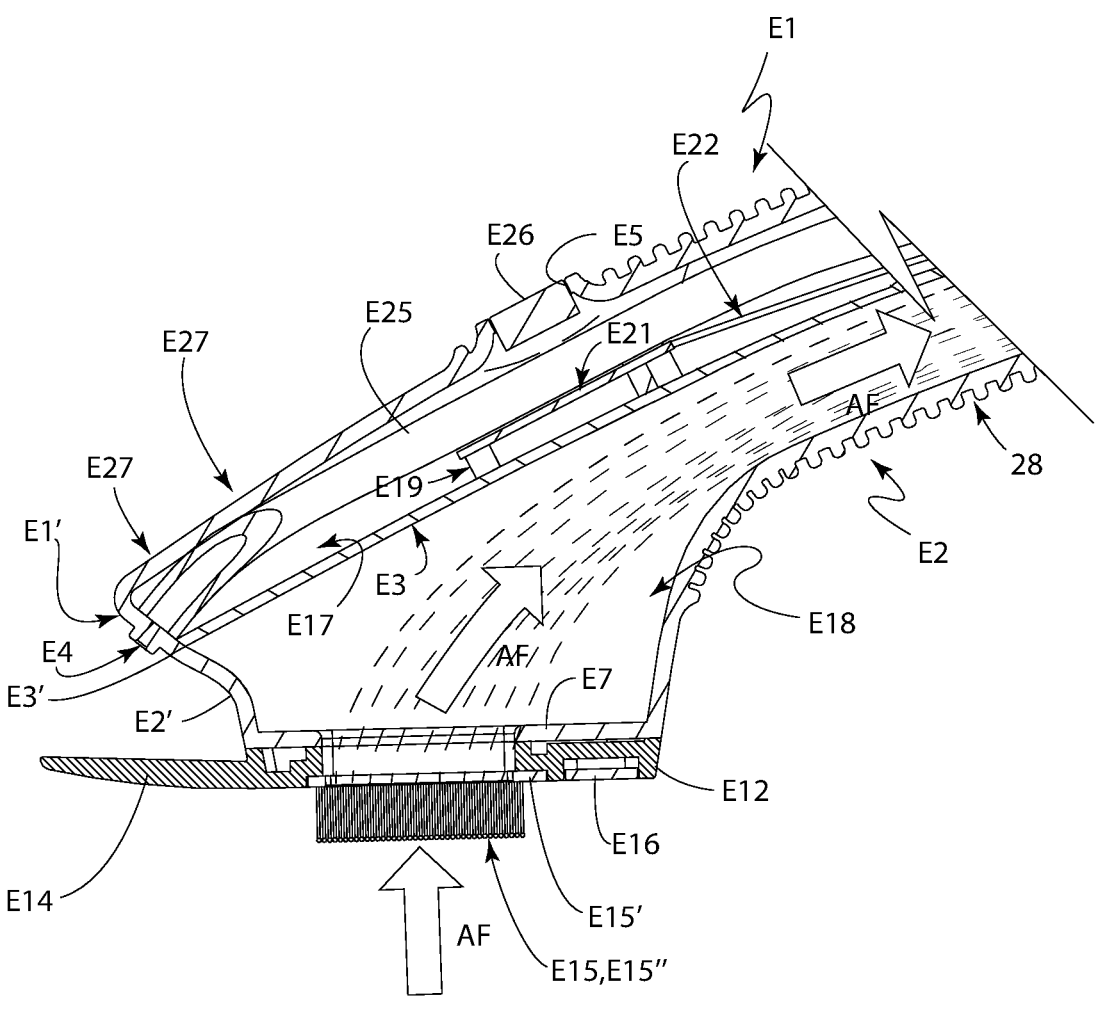
Figure 13:
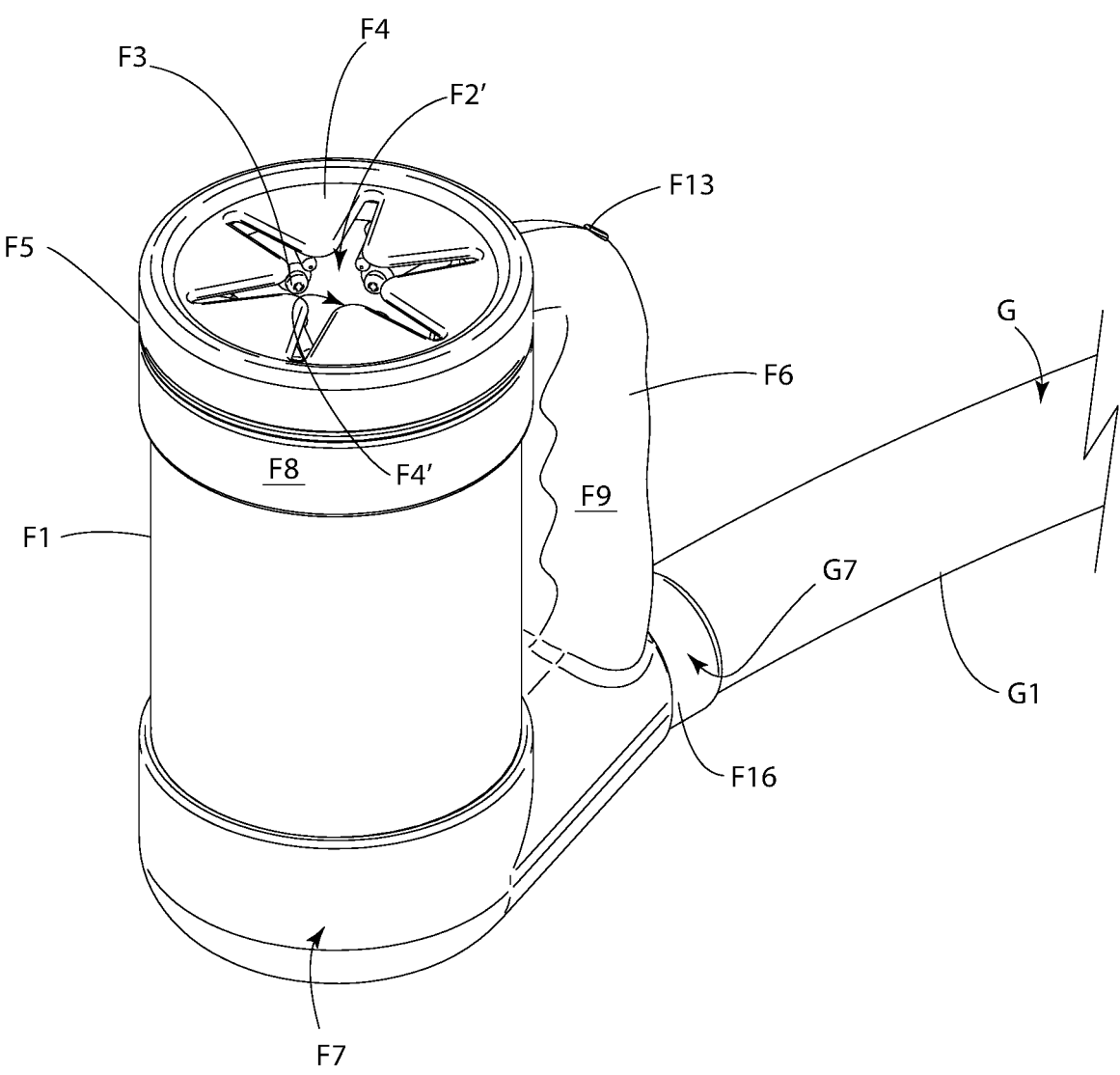
Figure 14:
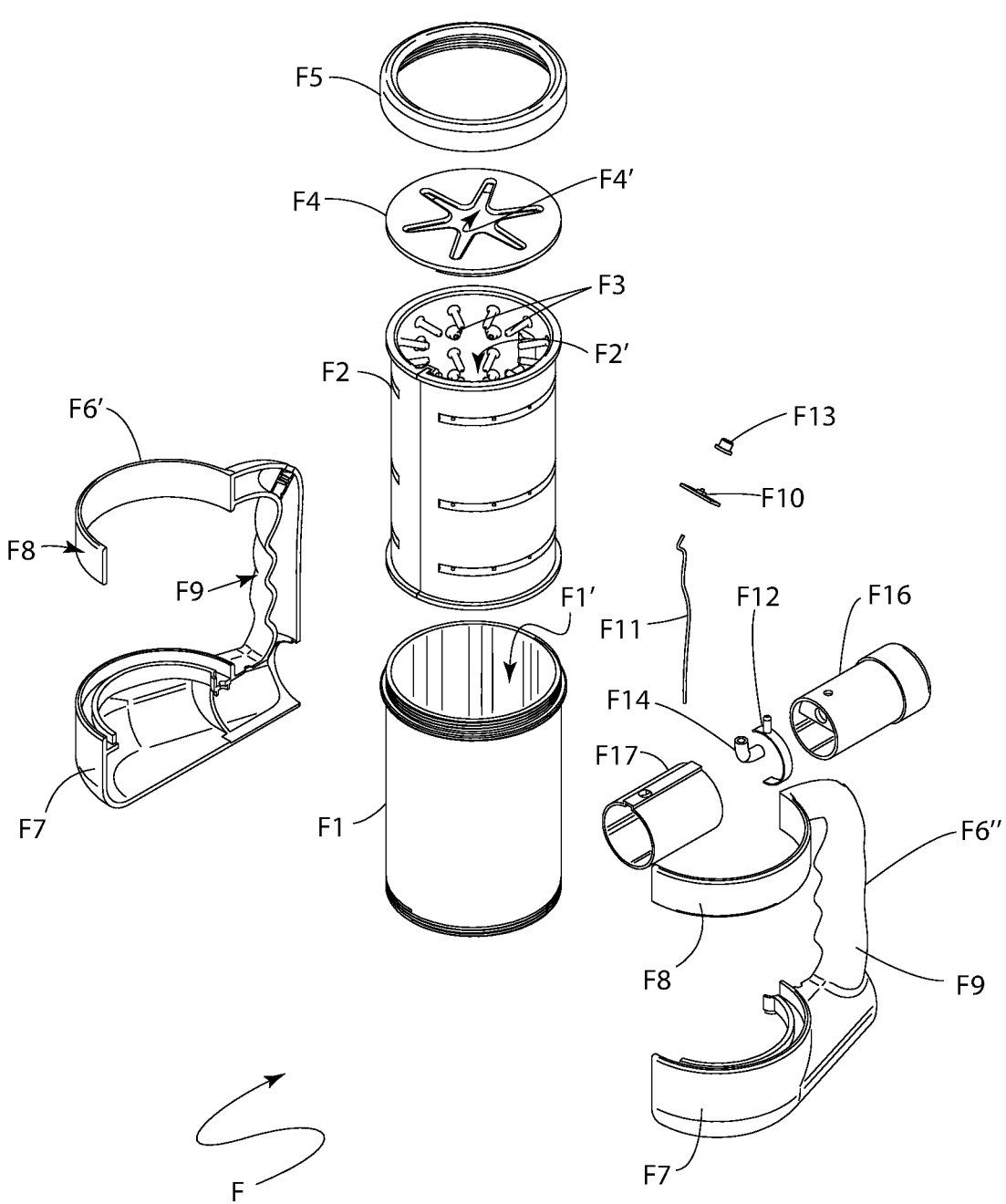
Figure 15:
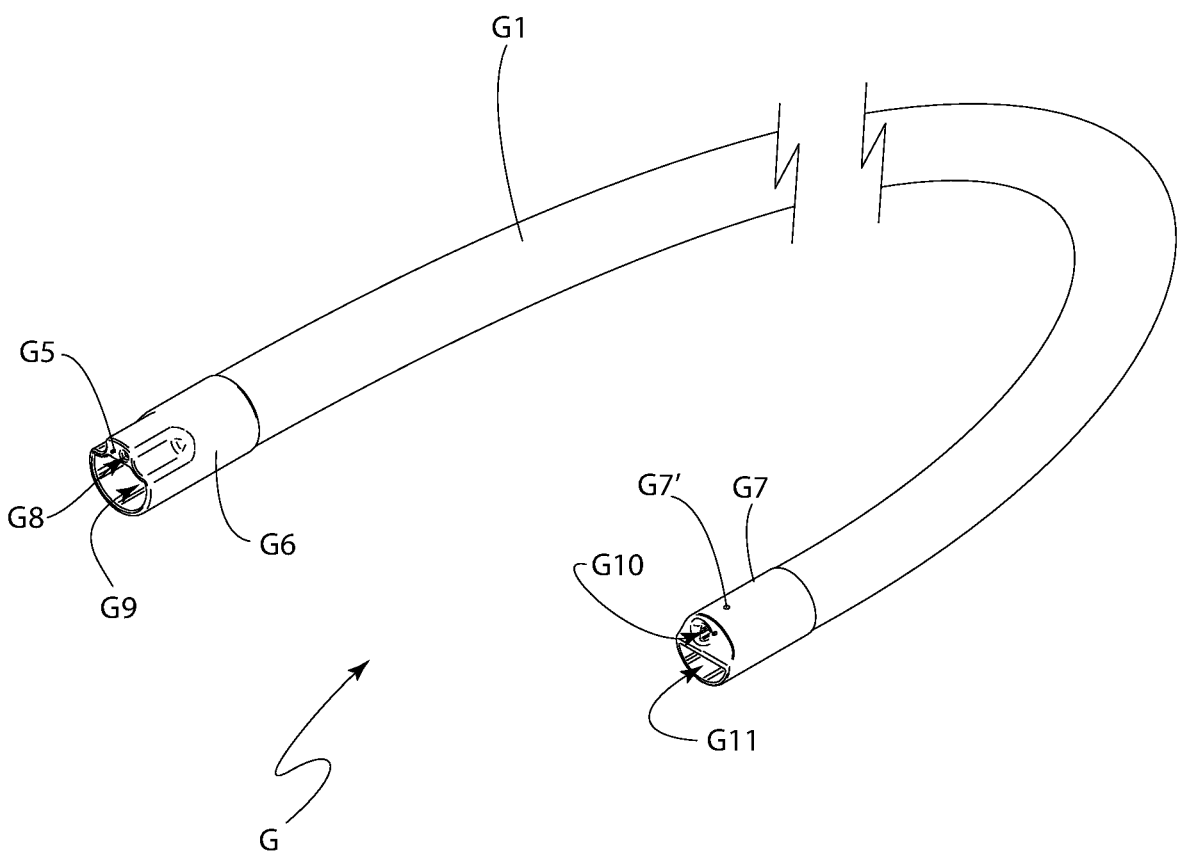
Figure 16:
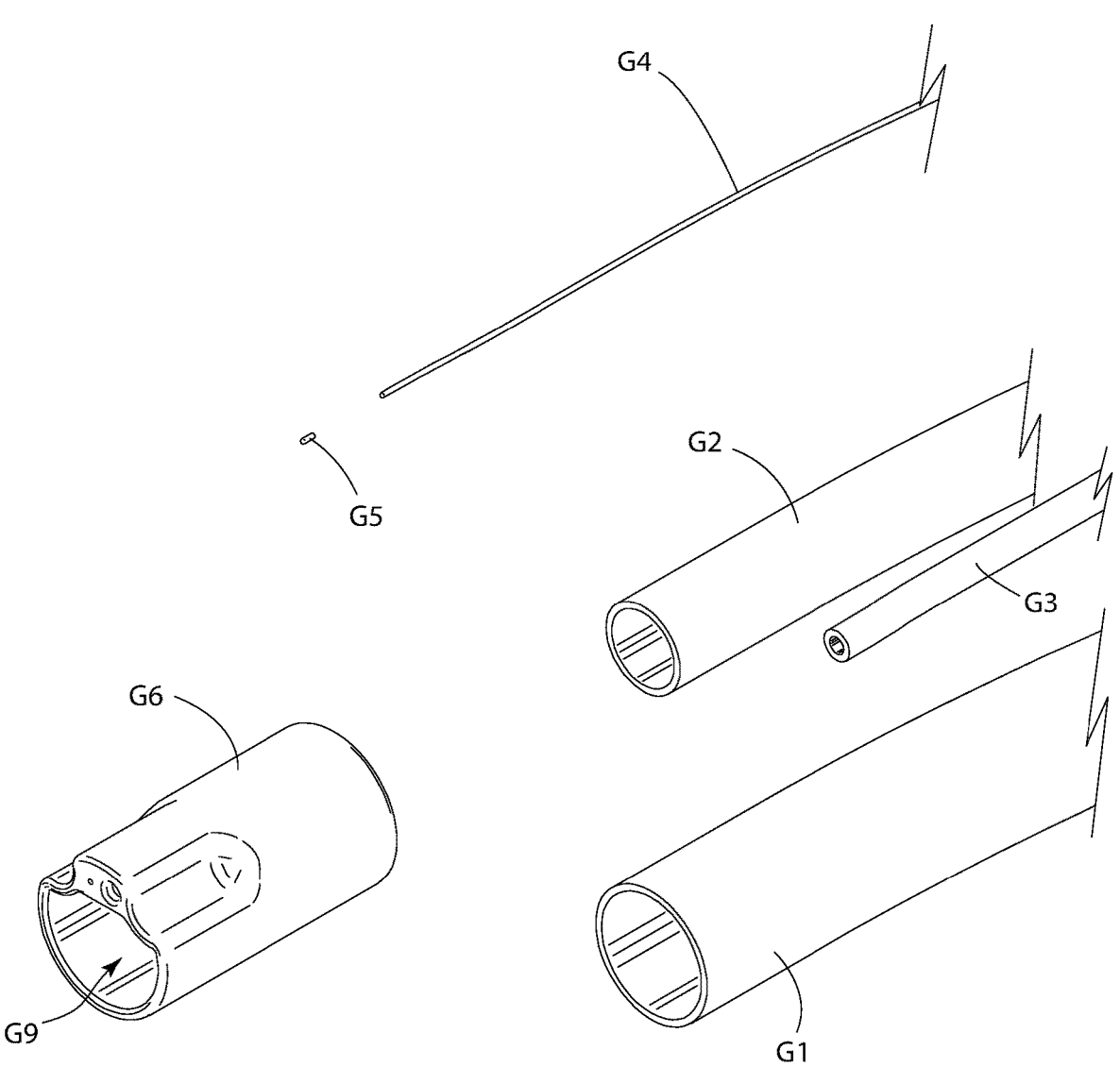
Figure 17:
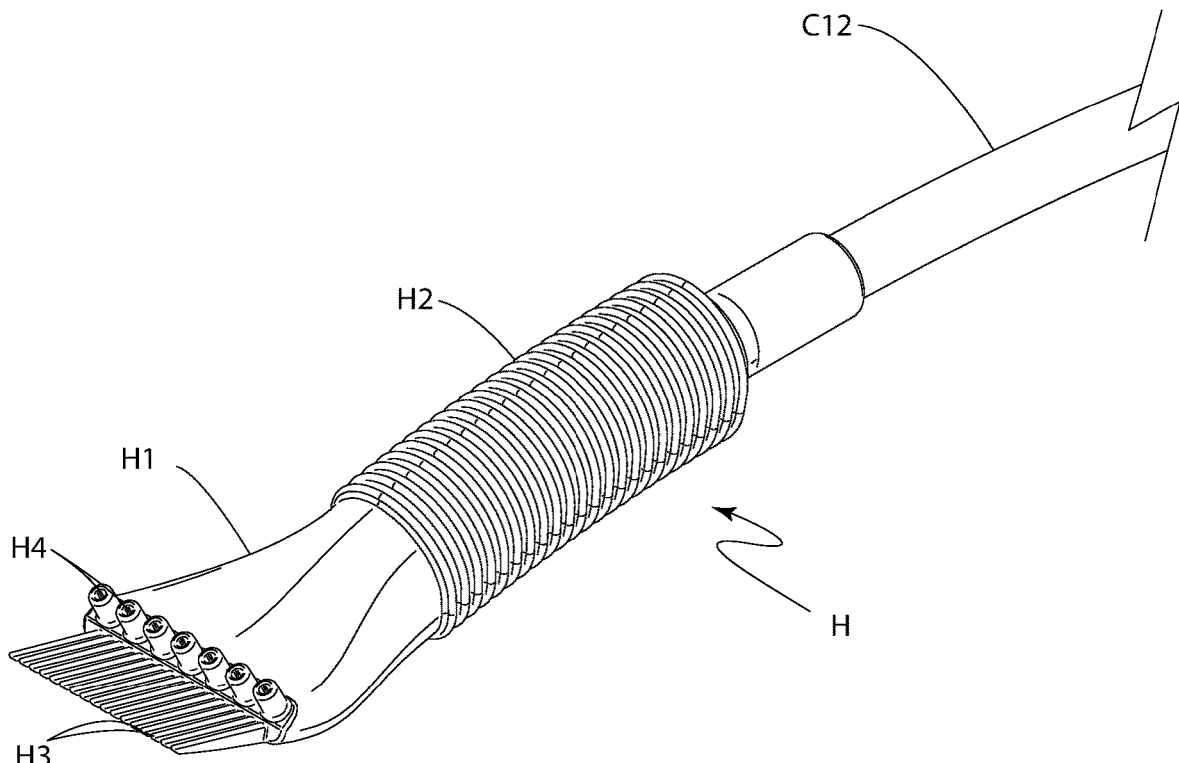
Figure 18:
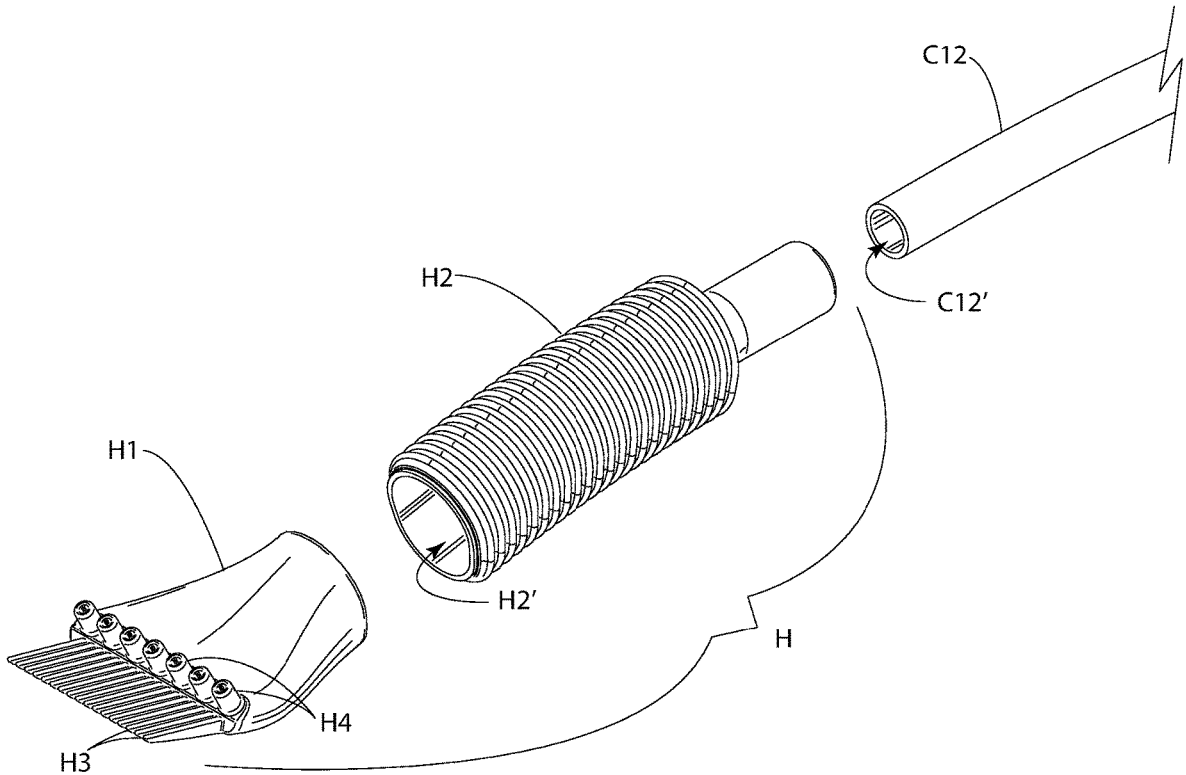
Figure 19:
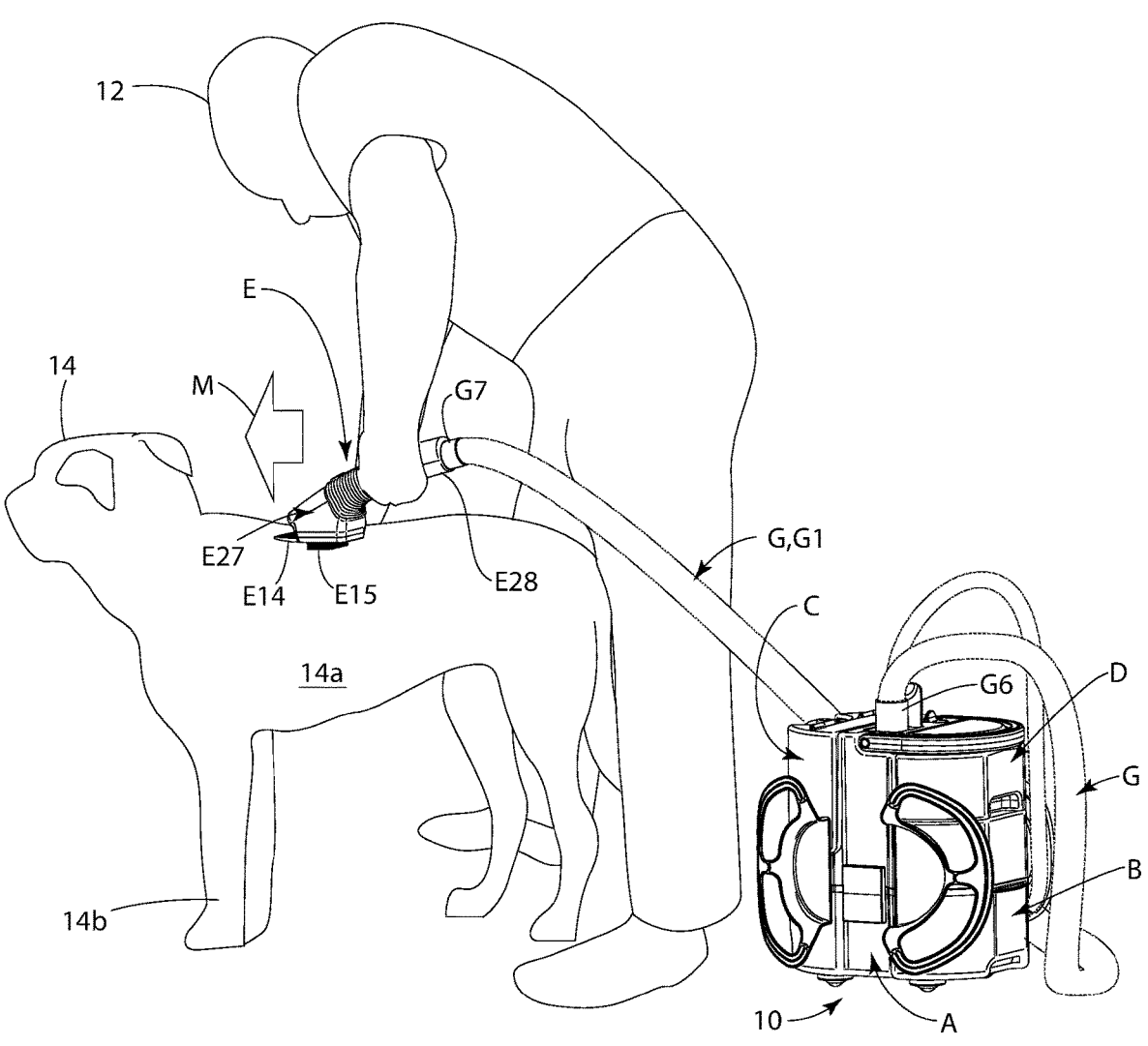
Figure 20:
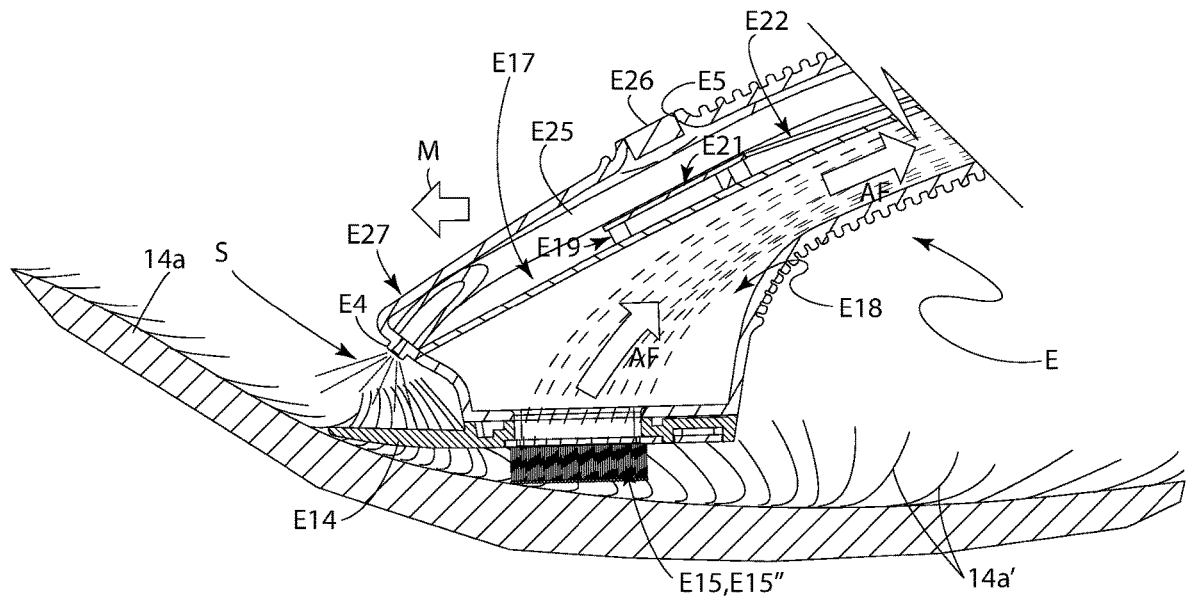
Figure 21:
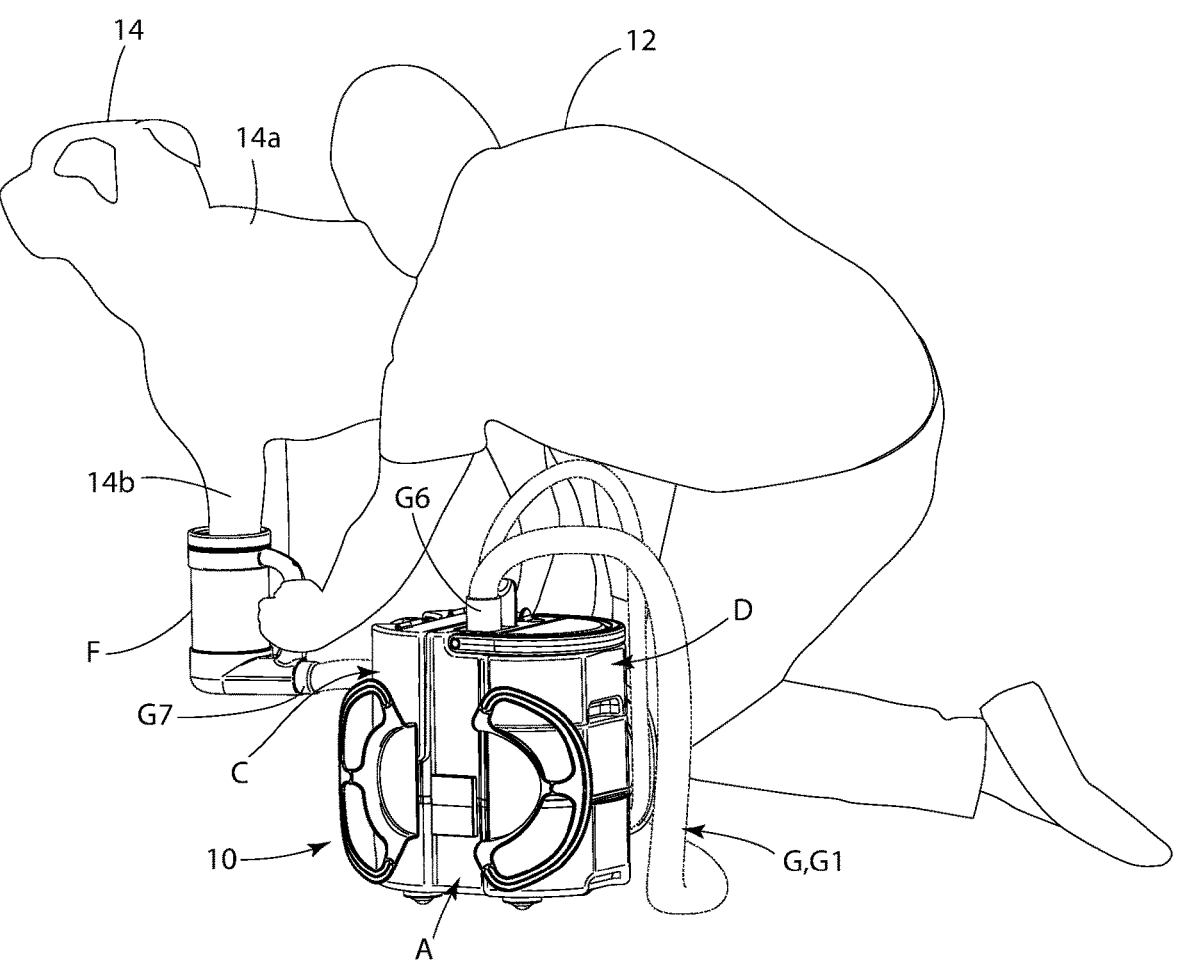
Figure 22:
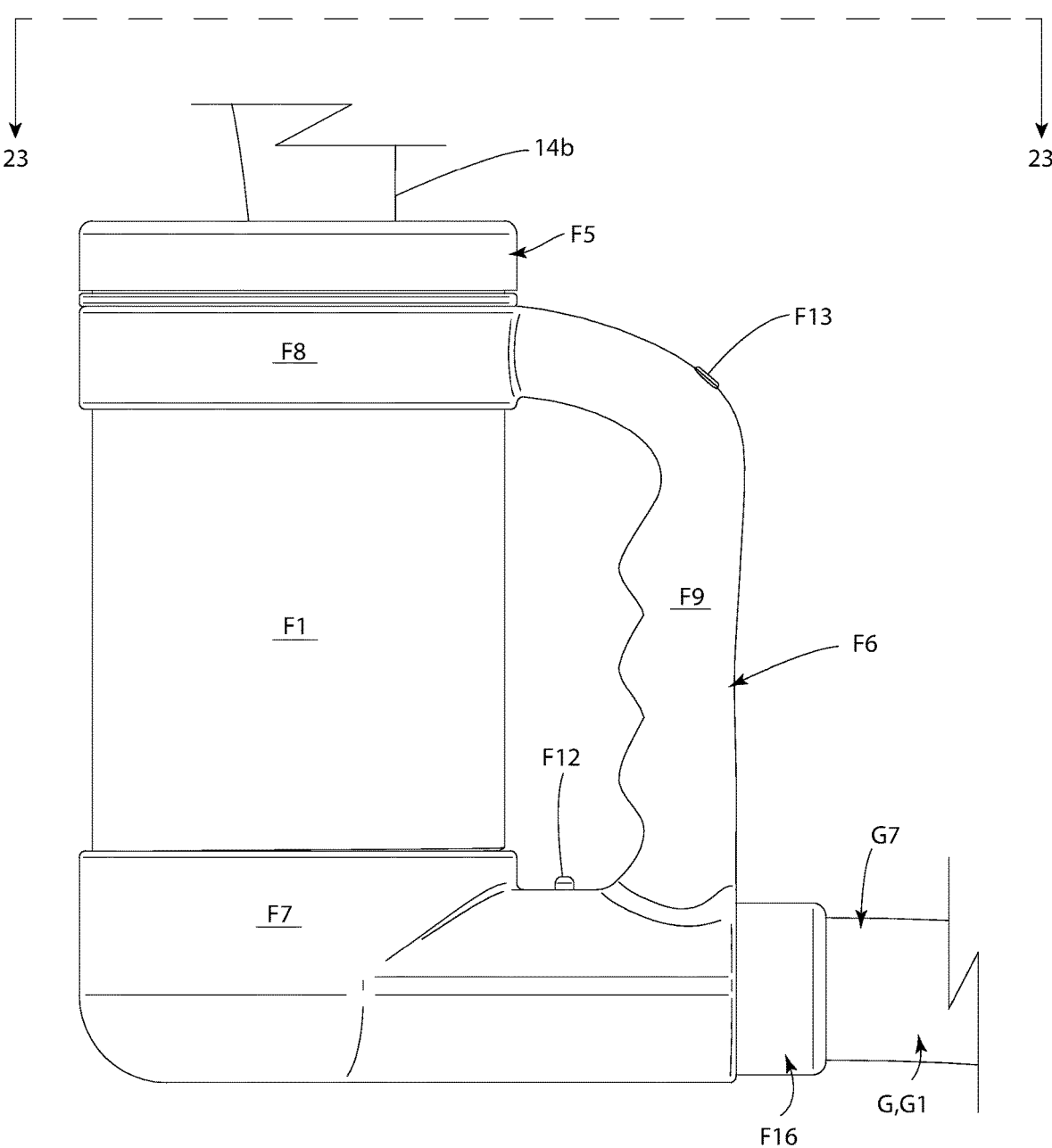
Figure 23:
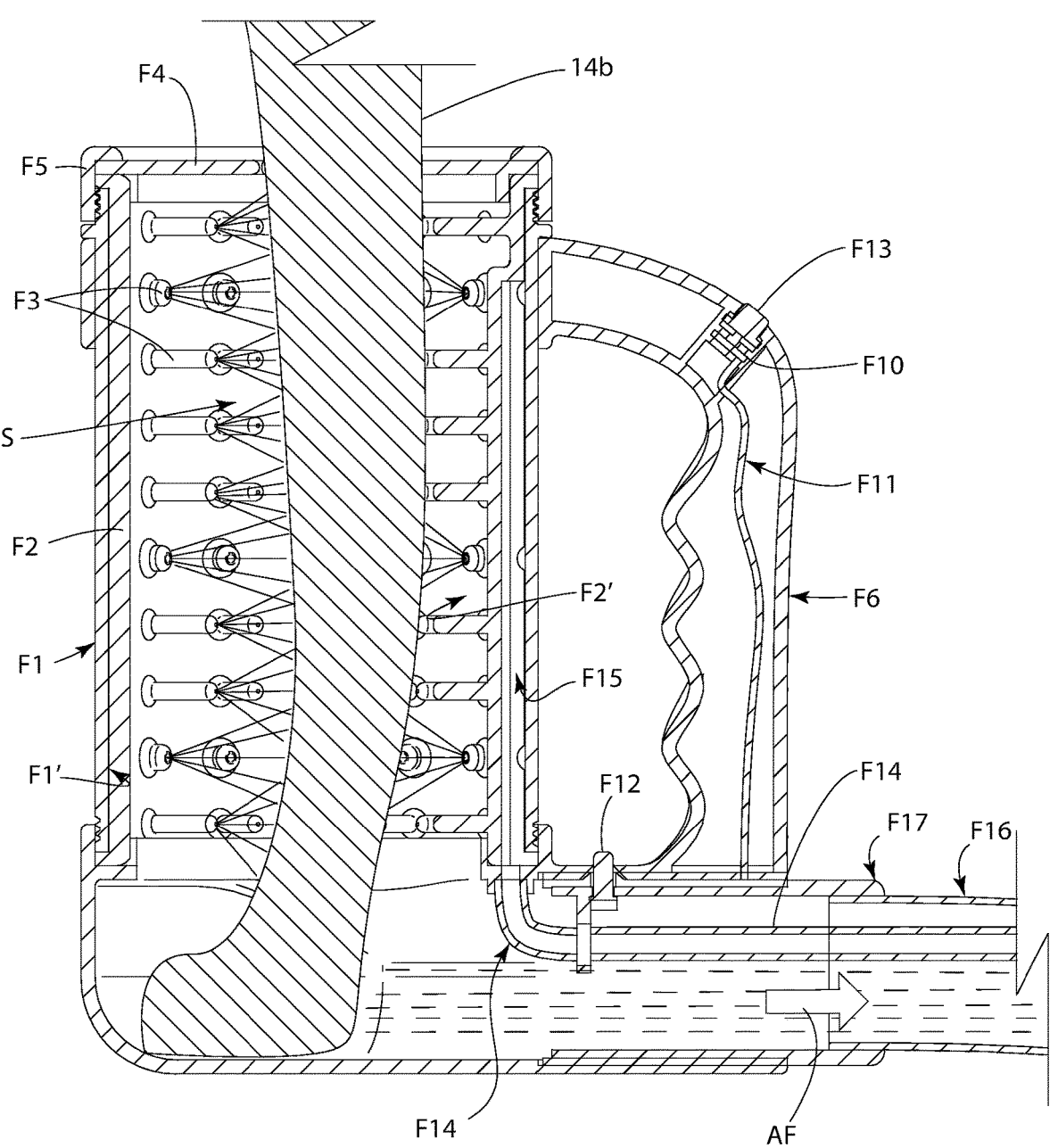
Figure 24:
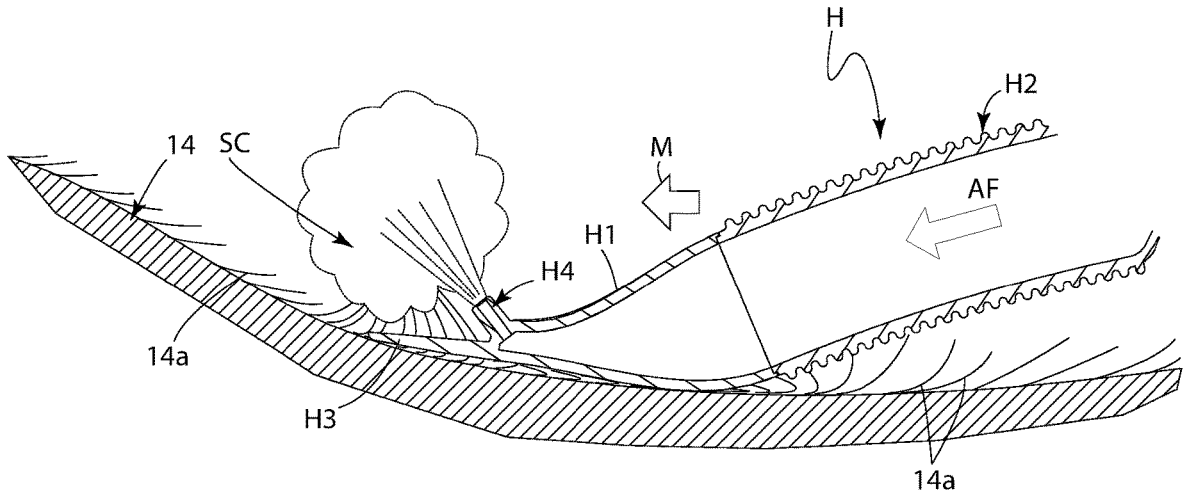

FIG. 3*b* is an exploded rear, top, left side perspective view of the device of FIG. 1 with the attachment hose omitted therefrom;

FIG. 4 is an exploded, front, top, right side perspective view of the body of the main unit shown in isolation;

FIG. 5 is an exploded, front, top, right side perspective view of a reservoir of the device shown in isolation;

FIG. 6 is an exploded, front, top, right side perspective view of a portion of a steam delivery system of the device shown in isolation;

FIG. 7 is an exploded, front, top, right side perspective view of a portion of a liquid delivery system of the device shown in isolation;

FIG. 8 is a vertical cross-section through the grooming and cleaning device taken along line 8-8 of FIG. 1;

FIG. 9 is a front, top, right side perspective view of a first attachment for the device of FIG. 1 shown engaged with a portion of the attachment hose;

FIG. 10 is rear, bottom, left side perspective view of the first attachment and the portion of the attachment hose shown in FIG. 9;

FIG. 11 is an exploded front, top, right side perspective view of the first attachment shown in isolation;

FIG. 12 is a partial longitudinal cross-section of the first attachment taken along line 12-12 of FIG. 9;

FIG. 13 is a front, top, right side perspective view of a second attachment used for cleaning paws, shown engaged with the end of the attachment hose;

FIG. 14 is an exploded, front, top, right side perspective view of the paw cleaner attachment of FIG. 13 shown in isolation;

FIG. 15 is a top perspective view of the attachment hose shown in isolation and showing the connectors at each of the first and second ends of the attachment hose;

FIG. 16 is a top, right side perspective view of the first end of the attachment hose;

FIG. 17 is a front, top, right side perspective view of a third attachment for the device shown connected to a portion of a steamer hose of the steam delivery system;

FIG. 18 is an exploded front, top, right side perspective view of the third attachment and the portion of the steamer hose illustrated in FIG. 17;

FIG. 19 is a diagrammatic view of the grooming or cleaning device in accordance with the present disclosure showing the first attachment being used to perform a grooming or cleaning task of the animal's fur using the liquid delivery system of the device;

FIG. 20 is an enlarged cross-section of the first attachment being used to perform the grooming or cleaning task illustrated in FIG. 19;

FIG. 21 is a diagrammatic view of the grooming or cleaning device in accordance with the present disclosure showing the second attachment being used to perform second device being used to perform a grooming or cleaning task on one of the animal's paws using the liquid delivery system of the device;

FIG. 22 is an enlarged front elevation view of the second attachment shown in FIG. 21;

FIG. 23 is a vertical cross-section through the second attachment taken along line 23-23 of FIG. 22; and FIG. 24 is an enlarged cross-section of the third attachment being used to steam clean the dog's fur using the steam delivery system of the disclosed device.

Similar numbers refer to similar parts throughout the drawings.

DETAILED DESCRIPTION

Referring to FIGS. 1-24, a device for cleaning and/or grooming an animal in accordance with the present disclosure is illustrated, generally indicated by the reference number 10. Device 10 generally comprises a main unit "A", a reservoir "B", a steam delivery system "C", and a liquid delivery system "D" that are configured into a compact portable piece of equipment. A user is able to selectively and independently activate the steam delivery system "C" or the liquid delivery system "D" in order to perform a grooming or cleaning task with device 10.

A first attachment "E" (FIGS. 9-12), a second attachment "F" (FIGS. 13 and 14), and an attachment hose "G" (FIGS. 15 and 16) are provided. The first and second attachments "E", "F", and attachment hose "G" are operatively engaged with the liquid delivery system "D" on the main unit "A" in order to perform a washing/shampooing task with the liquid delivery system "D".

The reservoir "B" and the attachment hose "G" form part of an extraction system which carries waste liquid, loose hairs, and other particulate debris away from the animal's body during and/or after the grooming or cleaning task using the liquid delivery system "D". The waste liquid, hairs, and debris are collected in the reservoir "B" for later disposal. The attachment hose "G" may also be operatively engaged with an air delivery system provided in the main unit "A" when it is desired to blow-dry the animal's fur after a grooming or cleaning operation with the liquid delivery system "D".

A third attachment "H" (FIGS. 17 and 18) is selectively engageable with the steam delivery system "C" (FIG. 2A) provided on the main unit "A" in order to perform a refreshing grooming or cleaning task utilizing steam generated by the steam delivery system.

Each of the afore-mentioned components and systems will be discussed in greater detail hereafter.

Main unit "A" includes a body A1 (FIG. 4) and a bottom plate A2 which are configured to cooperatively engage one another. Together, body A1 and bottom plate A2 bound and define an interior cavity within which are housed various components which enable device 10 to perform its functions. A first pair of hose-tidy wings A3 is provided on a front of body A1 and a second pair of hose-tidy wings A3 is provided on a rear of the body A1. The two wings of each pair of hose-tidy wings A3 are laterally spaced apart from one another and are configured and arranged such that a hose, such as attachment hose "G" may be wound therearound when not in use and thereby be retained neatly against body A1.

As best seen in FIG. 4, body A1 is of an inverted T-shape and provides a first shoulder region A1' and a second shoulder region A1". First shoulder region A1' provides a seat for a tank C6 (FIG. 6) of the steam delivery system "C" and the second shoulder region A1" provides a seat for a tank D1 (FIG. 7) of the liquid delivery system "D". A central support A1''' is located between first shoulder region A1' and second shoulder region A1". Device 10 is configured such that the tanks C6, D1 of the steam delivery system "C" and liquid delivery system "D" are detachably engageable with main unit "A". It will be understood, however, that in other embodiments, one or both of the tanks may be integrally formed as a part of body A1.

Referring still to FIG. 4, projections A4 are provided proximate a lower end of each of the front and the rear walls of central support A1'''. Projections A4 extend outwardly away from the associated front and rear walls of body A1. A locking clip A5 is pivotally engaged with central support A1''' via a locking clip pivot A5' and is configured to operatively engage with the associated projection A4 to secure body "A1" to reservoir "B". Locking clip pivot A5' enables the locking clip A5 to be pivoted between an open position and a closed position. The closed position of locking clip A5 is illustrated in FIG. 1. When the locking clip A5 is in the open position, body A1 is able to be lifted off reservoir "B". When body A1 is seated on reservoir "B" and locking clip A5 is moved to the closed position, the body A1 and reservoir "B" are locked in engagement with one another and will move as a single component.

As shown in FIG. 4, main unit "A" further includes a steam delivery system power connector A6 and a power cord "PC" (FIG. 2A) having a primary power connector A7 at one end and a fitting (not numbered but shown in FIG. 4) for engaging the power connector A6 at the other end. These power connectors aid in providing power to the various components of the device 10. It will be understood that wiring that connects the components of the system together has been omitted from the drawings for the sake of clarity. Primary power connector A7 may be connected to a remote power outlet (not shown) to selectively power device 10. In other embodiments, one or more rechargeable batteries or another suitable power source may be incorporated into device 10.

Figure 2A:
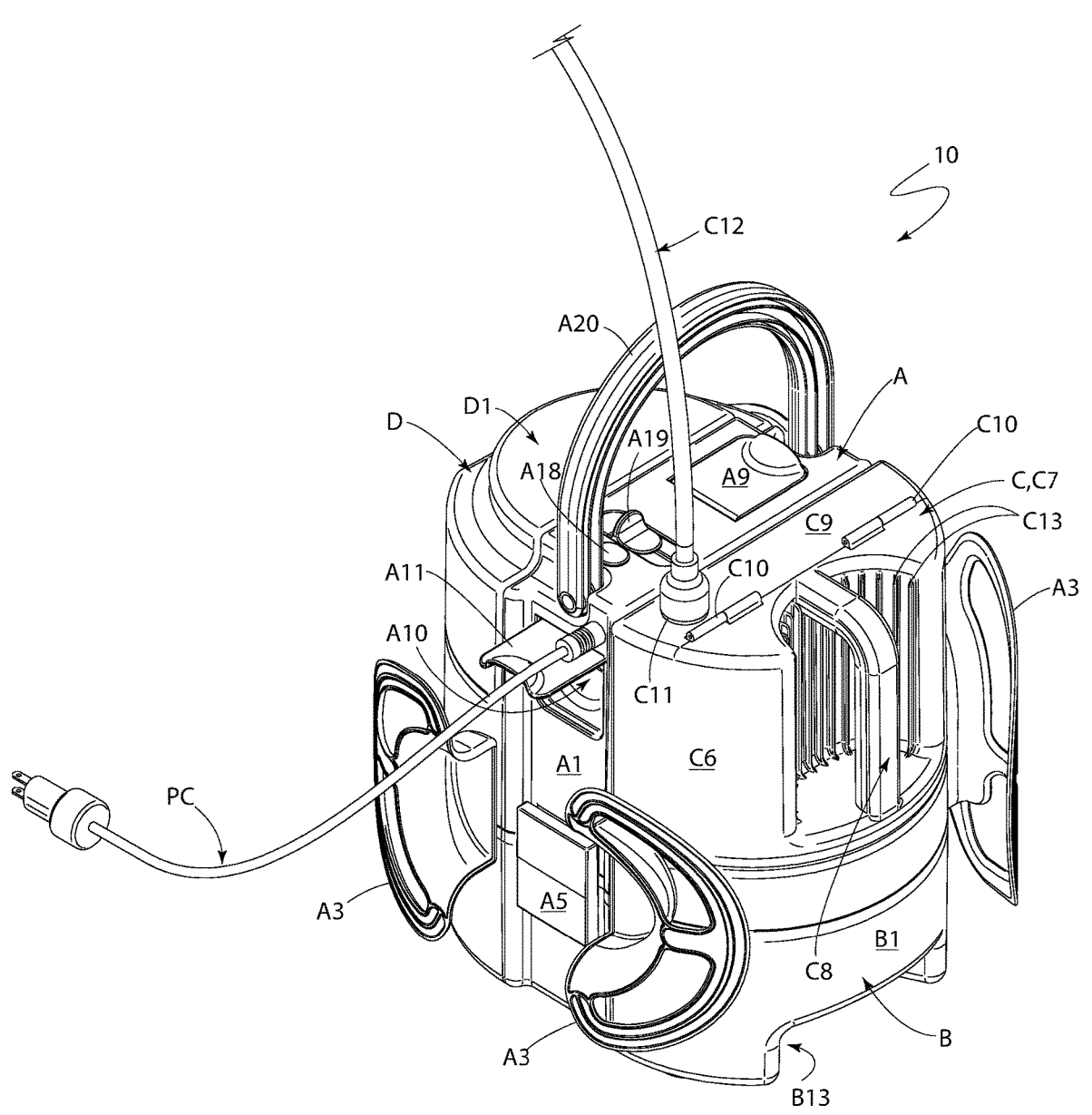
FIG. 2A is a rear, top, left side perspective view of the device of FIG. 1 shown with the attachment hose omitted therefrom.
Figure 2B:
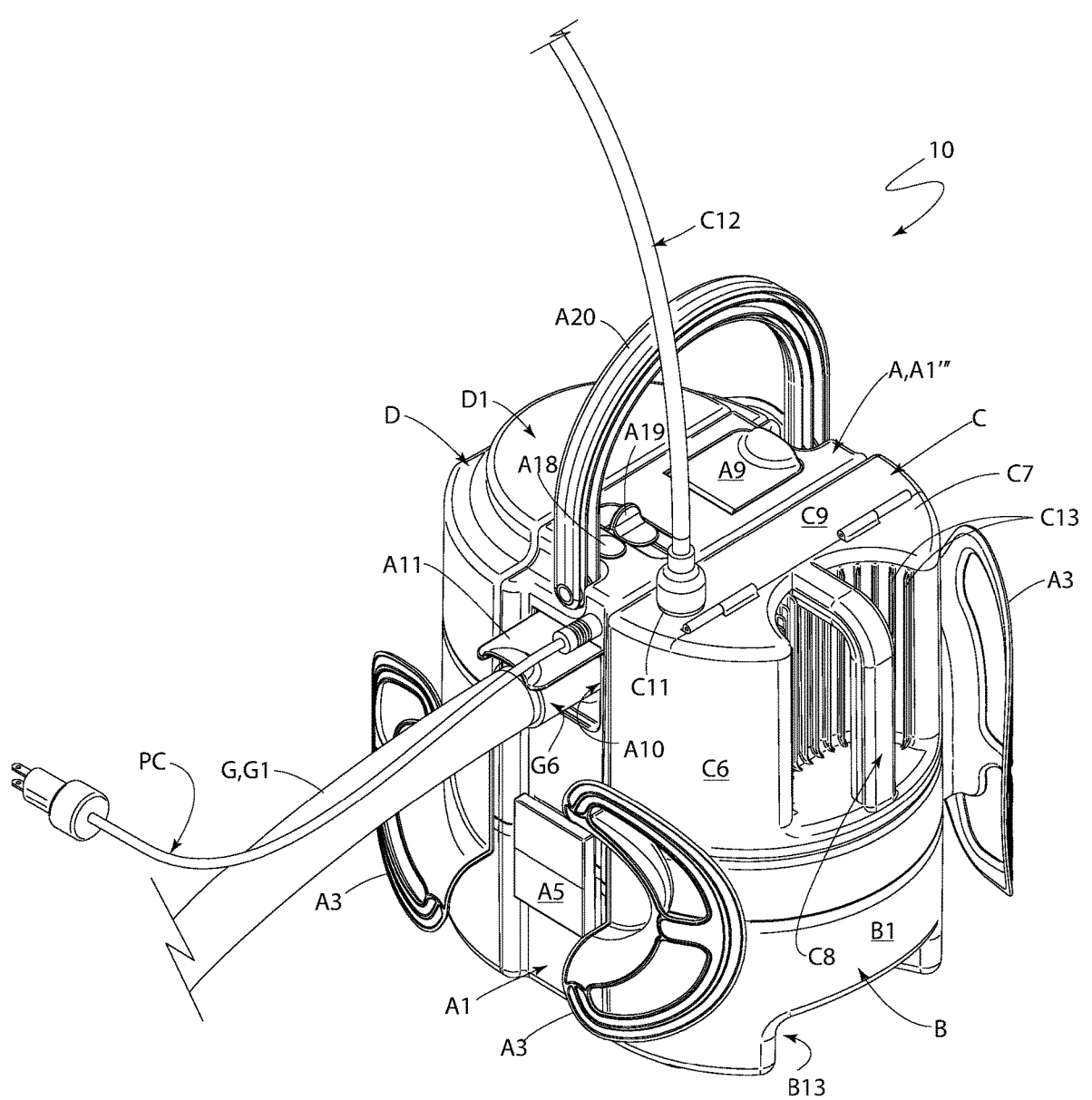
FIG. 2B is a rear, top, left side perspective view of the device shown in FIG. 2A with the attachment hose engaged with the body via a second attachment port.

Central support A1''' of body A1 defines a first attachment port A8 (FIG. 4) with which the attachment hose "G" is selectively operably engageable. The first attachment port is a vacuum port A8 and is utilized by both the liquid delivery system, and the extraction system provided on device 10. A cover plate A9 is pivotally engaged with body A1 via an axel A9' and is selectively movable between an open position (FIG. 2A) and a closed position (FIG. 2B). When cover plate A9 is in the closed position, access to the vacuum port A8 is prevented. When cover plate A9 is pivoted to the open position, access to the vacuum port A8 is made possible. FIG. 1, for example, shows cover plate A9 pivoted into the open position and the attachment hose "G" operatively engaged with the vacuum port A8. Although not illustrated herein, it should be understood that vacuum port A8 includes an end plate in which various pipes, hoses and electrical wiring terminates and is available for coupling with various pipes, hoses, and electrical wiring provided in attachment hose "G".

Central support A1''' of body A1 further defines a second attachment port A10 with which the attachment hose "G" is selectively operably engageable. The second attachment port is a blower port A10 (FIG. 4) that forms a part of an air delivery system provided on device 10. Blower port A10, like vacuum port A8, is selectively covered by a cover plate A11 that is able to pivot about a pivot axle A11'. Cover plate A11 may be pivoted to the open position (shown in FIG. 2A) to allow access to blower port A10 in order to connect the attachment hose "G" to the body A1. Although not illustrated herein, it should be understood that blower port A10 includes an end plate in which various pipes, hoses and electrical wiring terminates and is available for coupling with various pipes, hoses, and electrical wiring provided in attachment hose "G".

A fluid pump A12 (FIGS. 4 and 8) IS Housed within an interior compartment (not numbered) defined by body A1 and bottom plate A2. Pump A12 comprises a part of the liquid delivery system of device 10. Pump A12 is mounted to bottom plate A2 of main unit "A" in any suitable manner (not shown) and is operatively engaged with a pump inlet hose A13 and a pump outlet hose A14. The pump inlet hose A13 extends between the pump A12 and tank D1 (FIG. 7) of liquid delivery system "D". The pump outlet hose A14 extends between the pump A12 and vacuum port A8. When the cover plate A9 is moved to the open position, fluid communication is established between pump inlet hose A13, pump A12, pump outlet hose A14, tank D1, and the vacuum port A8.

The interior compartment defined by body A1 houses a blower/vacuum motor A15 which forms a part of the extraction system and the air delivery system of device 10. Motor A15 may be any suitable motor including a brushless motor. Motor A15 is operatively engaged with a blower inlet hose A16 and a blower outlet hose A17. Blower/vacuum motor A15 is mounted to bottom plate A2 in any suitable manner (not shown) and may be located proximate pump A12. Blower inlet hose A16 terminates in an opening (not shown) defined in bottom plate A2 of body "A1". The purpose of blower inlet hose A16 will be discussed later herein. The blower outlet hose A17 terminates in blower port A10. When the cover plate A11 of blower port A10 is moved to the open position, fluid communication is established between the motor A15 and the blower port A10 via the blower outlet hose A17. When the attachment hose "G" is engaged with the blower port A10, fluid communication is established between the blower/vacuum motor A15 and the bore of the attachment hose "G".

Central stack A1′′′ of body A1 also includes a power switch A18 and controls A19. Although not illustrated herein, it will be understood that power switch A18, controls A19, pump A12, motor A15, and all other powered components of device 10 are all electrically wired to one another or are capable of being electrically coupled to one another. The wiring has been omitted from the drawings for the sake of clarity of illustration. The electrical components of device 10 are provided with power via the power connector A6 and/or primary power connector A7.

Referring still to FIG. 4, a handle A20 is provided on main unit "A". As stated earlier herein, device 10 is portable and handle A20 enables a user to pick up and carry device 10 from one location to another. Handle A20 is pivotally engaged with central stack A1′′′ of body A1 via fasteners A21 received in pivot posts A22. Handle A20 is able to be moved to a use position where the handle A20 arches above central stack A1′′′ (as shown in FIG. 2A). In this use position, a user is able to use grasp handle A20 to lift device 10 off a surface and carry device 10 to a new location. Handle A20 is able to be moved to a storage position (FIG. 1) where the handle A20 is received in a complementary groove (not numbered) defined in an upper end of tank D1 when device 10 is in use grooming or cleaning an animal, or when device 10 is not in use and is not being moved.

Referring still to FIG. 4, second shoulder region A1″ of body A1 defines an aperture A23 therein. Aperture A23 is in fluid communication with the interior compartment defined by body A1. First shoulder region A1′ also defines an aperture therein (shown but not numbered in FIG. 8) that is in fluid communication with the interior compartment of body A1. The purpose of these two apertures will be described later herein.

Referring now to FIGS. 5 and 8, there is illustrated the reservoir "B" of device 10. Reservoir "B" comprises a tank B1 and a lid B2 that is complementary to an upper end of tank B1, and is configured to be interlockingly engaged therewith. Tank B1 and lid B2 bound and define an interior cavity B1′ that holds waste liquids and materials captured through the grooming or cleaning of an animal (as will be described later herein). An aperture B3 is defined in a projection B4 which extends upwardly from an upper surface of lid B2. A tank pouring filter plate B5 extends across the aperture B3 and a filter plate cover B6 covers the filter plate B4 and closes off access to the opening B3. Lid B2 further defines a first opening B7 and a second opening B8 therein that are in fluid communication with the interior cavity B1′ of reservoir "B". The second opening B8 is placed in fluid communication with the vacuum port A8 of main body "A". The purpose of this fluid communication will be discussed later herein.

Referring to FIGS. 5 and 8, when body "A1" is seated upon lid B2 of reservoir "B", the opening (not shown) in the bottom plate A2 of main unit "A" and in which blower inlet hose A16 terminates, is aligned with first opening B7 in lid B2 of reservoir "B". Interior cavity B1′ of reservoir "B" is placed in fluid communication with blower/vacuum motor A15 via blower inlet hose A16. A blower filter B9 is operatively engaged with the interior surface of lid B2 and is aligned with first opening B7 in lid B2 and the opening to blower inlet hose A16. Blower filter B9 extends into the interior cavity B1′ of reservoir "B" as is best seen in FIG. 8. Blower/vacuum motor A15 is therefore placed in fluid communication with the interior cavity B1′ of reservoir "B" via blower filter B9.

When waste liquid, loose hairs, and particulate materials are vacuumed into reservoir "B" after a cleaning operation, the liquids and solids displace air within the interior cavity B1′, and the displaced air flows out of interior cavity B1′ through the aperture B3 and filter plate B6 in lid B2 and into the environment surrounding device 10. If air is sucked out of interior cavity B1′ of reservoir "B" through blower filter B9, through first opening B7, through the opening (not shown) defined in bottom plate A2 of body "A1", into the blower inlet hose A16, and into blower/vacuum motor A15, then air will flow through filter plate B6 and aperture B3 from the exterior environment. As air moves through blower filter B6 or B9, the air is filtered to remove any particulate materials therefrom. When motor A15 is activated to blow air through blower outlet hose B16 and outwardly from blower port A10, the air will flow into the bore of the attachment hose "G" and subsequently out of any attachment engaged with attachment hose "G". The purpose of blowing air outwardly from blower portion A10 will be discussed later herein.

Referring still to FIGS. 5 and 8 each of the tank B1 and lid B2 includes a projection B10, B11, respectively, which extends outwardly towards a front and a rear of device 10. Projections B10 and B11 are vertically aligned with one another. When body "A1" is seated on lid B2 of reservoir "B" as illustrated in FIG. 8, projections B10 and B11 will align with the projections A4 on body "A1". Locking clips A5 are pivoted into THE closed position, capturing the aligned projections A4, B10, and B11 and thereby securely holding body "A1" and reservoir "B" to one another.

As mentioned earlier herein, device 10 is portable. Ball casters B12 are operatively engaged within recesses (not numbered but shown in FIG. 8) defined in the bottom wall (not numbered) of tank B1. The ball casters B12 extend downwardly for a distance below the bottom wall of the tank B1 and maintain the bottom of the reservoir "B" a distance off a surface upon which device 10 stands. Casters B12 enable a user to roll device 10 across the surface from one location to another. It will be understood that casters B12 may be replaced with wheels or any other mechanism that enables a user to easily move device 10 across the surface from location to location.

Referring to FIGS. 1, 2A, and 8, it can be seen that reservoir "B" defines generally U-shaped recessed regions where a first end of the reservoir "B" meets a bottom wall of the reservoir "B" and where an opposed second end of the reservoir "B" meets the bottom wall of the reservoir "B". These recessed regions B13 are useful for a user to place their hands into if the device 10 is to be lifted off the surface upon which device 10 stands.

Referring now to FIGS. 3B, 6, and 8 steam delivery system "C" of device 10 includes a base plate C1 having a projection C1' (FIG. 3B) extending upwardly from an upper surface of the base plate C1. The projection C1' defines an aperture C1" therein. Aperture C1" extends through the projection C1' and terminates in an opening in a lower surface of the base plate C1. A steam delivery system power connector C2 is operatively engaged in the aperture C1" and, as illustrated in FIG. 8, is coupled with the power connector A6 of the main unit "A". A heating system is provided as part of the steam delivery system "C" and the heating system is utilized to generate steam. The heating system includes a heater element C3 located on base plate C1 and electrically coupled to the power connector C2. A support insert C4 is seated on the base plate C1 and extends over and covers heater element C3 and power connector C2. The heating system further includes a hotplate C5 engaged on support insert C4. A steamer tank C6 is detachably operatively engaged with main unit "A" and is positioned to be affected by the heating system. Steamer tank C6 has a bottom wall (unnumbered) and a peripheral side wall (unnumbered) that extends upwardly from the bottom wall. The bottom wall and peripheral side wall bound and define an interior cavity C6' that will retain a volume of liquid therein. An upper housing C7 is operatively engaged with tank C6 and a handle C8 is operatively engaged with a vertical support provided on the upper housing C7. A lid C9 is pivotally engaged with the upper housing C7 via a lid axel C10. Together, the upper housing C7 and lid C9 (when in a closed condition) is complementary in shape to an upper end of the steamer tank C6. Lid C9 is pivotable relative to the upper housing C7 between an open position and a closed position.

The heating system that forms part of the steam delivery system "C" is operatively engaged with steamer tank C6 in such a way that when activated, any liquid within the interior cavity C6' of steamer tank C6 will be heated to the point that steam is generated. The steamer tank C6 may be disengaged from main unit "A" if the user desires to fill the steamer tank C6 with a volume of liquid. In other instances, the lid C9 may be pivoted to the open position and the steamer tank C6 is filled in situ. Typically, the liquid that is placed within steamer tank C6 is water but other types of cleaning or conditioning liquids may be utilized instead. The term "water" is to be interpreted herein as any desired and suitable liquid that may be heated and converted to steam safely and which performs the desired grooming or cleaning task for which the steam is intended.

Steamer tank C6 is able to be selectively disengaged from body A1 of main unit "A" by grasping a handle formed by the vertical support on upper housing C7 and the handle C8. When steamer tank C6 is to be filled with water, the lid C9 is pivoted to the open position and liquid is introduced into the tank C6 through the opening defined between the upper edge of the steamer tank C6 and the inner edge of the upper housing C7. Although not illustrated herein, it will be understood that steamer tank C6 may be provided with a maximum fill line to indicate to the user a maximum amount of liquid to introduce into tank C2. Sufficient space needs to be left above the upper surface of the liquid within steamer tank C6, the underside of lid C9, and the upper housing C7 to allow steam to be generated and to build up in that space within steamer tank C6 as the liquid is heated.

FIG. 6 shows that a projection (unnumbered) extends upwardly from an upper surface of the tank lid C9. A hole C9' is defined through this projection and extends to an opening in the underside of the lid C9. A steamer hose connector C11 is provided at a first end of a steamer hose C12 and is operatively engaged with the projection on the steamer tank lid C9. When connector C11 is so engaged, the bore of the steamer hose C12 is place in fluid communication with interior cavity C6' defined by steamer tank C6 via the hole C9'. When the fluid within steamer tank C6 is heated to a sufficient degree by the heating system steam is generated and accumulates in the space within steamer tank C6. As the steam accumulates, pressure builds within the space in tank C6 and the steam flows through opening C9' and into hose C12. As will be discussed later herein, the third attachment "H" is a steamer attachment and may be operatively engaged with a remote second end of the hose C12 and be utilized to groom or clean the fur of an animal.

As best seen in FIGS. 2A and 6, a wall C6" of the steamer tank C6 is concavely curved in a region opposite handle C8. This concave wall C6" of steamer tank C6 provides space for a user to insert their hand when gripping handle C8 in order to manipulate steamer tank C6 such as when removing the same from main unit "A". The concavely curved wall C6" of steamer tank C6 is provided with a plurality of ribs C13 that extend outwardly therefrom. The ribs C13 are arranged so as to extend from proximate the upper end of the steamer tank C6 to a lower end thereof. Adjacent ribs C13 are laterally spaced apart from one another. In one embodiment, each rib C13 may be V-shaped in cross-section and be arranged so that the apex of the V-shape is located a distance outwardly away from the curved tank wall C6". Ribs C13 are provided to increase the surface area of the curved tank wall C6" and promote cooling of the steamer tank C6 and any liquid therein when the heating element C3 is switched off when the steamer unit "C" is no longer required. . . g4

Referring now to FIGS. 7 and 8, liquid delivery system "D" includes the tank D1, which is detachably engageable with main unit "A", and a dispenser cap D2. FIG. 7 shows that tank D1 includes a depression D3 proximate a lower end of the tank D1. The depression D3 is located on a region of the tank D1 which will form part of an exterior surface of the cleaning device 10 when tank D1 is engaged with main unit "A". The depression D3 provides a region for a user to easily grip tank D1 to remove same from the main unit "A" as will be described later herein.

Tank D1 is seated on the second shoulder region A1" of body A1. FIG. 8 shows that tank D1 defines an interior compartment D1' configured to retain a volume of cleaning liquid therein. One suitable cleaning liquid that may be placed into tank D1 is shampoo, particularly a mixture of shampoo and water, but it will be understood that water, various conditioners and moisturizers, or any other desired liquid useful for performing a grooming or cleaning task on an animal's fur may be placed within the interior compartment D1' of tank D1. The terms "shampoo" and "cleaning liquid" should be interpreted herein as encompassing any suitable fluid for performing a grooming or cleaning task.

Dispenser cap D2 is provided on tank D1 to normally close off access to interior compartment D1'. Although not specifically identified in the attached figures, it will be understood that dispenser cap D2 may include a valve to aid in controlling the flow of shampoo or cleaning liquid out of tank D1. Tank D1 may be selectively disengaged from main unit "A" in order to place the volume of cleaning liquid into the interior compartment D1' defined by tank D1. The filling of tank D1 is accomplished by disengaging tank D1 from body A1, orienting tank D1 in such a way as to allow shampoo to flow into the interior compartment D1 through an aperture (not shown) defined in a bottom wall of tank D1. Once the tank D1 is filled (up to an appropriate level), the dispensing cap D2 is reengaged with tank D1 to close off the aperture; the tank D1 is inverted, and then the tank D1 is reinstalled on body A1.

When tank D1 is operably engaged with main unit "A", dispenser cap D2 is cooperatively received within aperture A23 defined in the second shoulder region of the body A1. Pump inlet hose A13 is coupled with a through-passage (not shown) defined in dispenser cap D2 and thereby places the interior compartment D1' of tank D1 in fluid communication with pump A12. Pump inlet hose A13 places port A8 in fluid communication with pump A12 and thereby with tank D1 via pump inlet hose A13 and dispenser cap D2.

As indicated earlier herein, a number of attachments are provided as part of the device 10. First attachment "E" is illustrated in FIGS. 9-12. Second attachment "F" is illustrated in FIGS. 13-14. First and second attachments "E" and "F" are operatively engaged with main unit "A" via a hose "G" which is illustrated in FIGS. 15 and 16.

Referring to FIGS. 9-12, first attachment "E" comprises a first housing section E1 (FIG. 11) and a second housing section E2 which are configured to be matingly engaged with one another about an elongate plate-like shield E3. First housing section E1 is an elongate member that is generally semi-cylindrical in cross-section and includes a first end E1', an opposed second end E1", and a wall (unnumbered) that extends between first end E1' and second end E1". First housing section E1 has a longitudinal axis extending between and oriented at right angles to first end E1' and second end E1". An exterior surface of a first portion of the wall extending between first end E1' towards second end E1" is relatively smooth. An exterior surface of a second portion of the wall which extends from the first portion towards the second end E1" includes a plurality of ribs E1'" thereon. The ribs are oriented at right angles to the longitudinal axis of the first housing section E1. An exterior surface of a third portion of the wall of first housing section E1 extending between the second portion and the second end E1" is smooth. A nozzle E4 extends longitudinally outwardly from first end E1' of first housing section E1 in a direction moving away from second end E1". A first aperture E5 is defined in the ribbed second portion of first housing section E1 and a second aperture E6 is defined in the smooth third portion of first housing section E1. Both the first aperture E5 and second aperture E6 extend between the exterior surface and an interior surface of the wall. The purpose of apertures E5, E6 will be discussed later herein. Although not illustrated herein it will be understood that the wall of first housing section E1 defines an interior cavity that extends from first end E1' to second end E1" and is semi-circular in cross-section.

Still referring to FIG. 11, Second housing section E2 is differently configured from first housing section E1. Second housing section E2 includes a first end E2' and a second end E2" and a wall that extends between first end E2' and second end E2". A first region of the wall extending outwardly from first end E2' towards second end E2" includes a square region identified by the reference character E7. A first surface of the square region E7 forms the first end E2' of second housing section E2. Two generally triangular side walls E8 extend outwardly from opposite sides of the square region E7, and an end wall E9 extends outwardly from square region E7 opposite first end E2', extends between the side walls E8 and transitions into a semi-circular second region E10 that is substantially similar in configuration to the ribbed second portion and smooth third portion of first housing section E1. The semi-circular second region E10 includes a ribbed portion and a smooth portion that are shaped and sized substantially identically to the second portion and third portion of first housing section E1. First region E7 of second housing section E2 defines a first aperture E11 therein, the purpose of which will be described later herein. Second housing section E2 defines an interior cavity, identified by the reference character E2'" that extends between first end E2' and second end E2". The interior cavity E2'" proximate first end E2' is shaped differently from the shape of the interior cavity E2'" proximate second end E2".

Referring still to FIG. 11, a comb frame E12 is provided for operative engagement with the bottom wall E7 of second housing section E2. Comb frame E12 includes a region that is complementary to bottom wall E7 and defines an aperture E13 therein that is of a complementary size and shape to aperture E11. Comb frame E12 has a first surface E12' (FIG. 10) that will be placed proximate an animal's body during use of first attachment "E". Comb frame E12 further includes a second surface E12" from which a plurality of tines E14 extend outwardly. Second surface E12" is oriented at an angle relative to first surface E12'. In one embodiment the angle between first surface E12' and second surface E12" is ninety degrees. Tines E14 are therefore oriented at right angles to first surface E12'. The tines E14 are substantially rigid and all extend outwardly form comb frame E12 in the same direction. The tines E14 are laterally spaced apart from one another and all tines E14 are of generally a same length as one another. It should be noted that the plurality of tines E14 do not extend outwardly and downwardly from first surface E12' and downwardly towards the body of the animal. Instead, because the plurality of tines E14 extend outwardly away from second surface E12", the tines will be oriented generally parallel to first surface E12' and therefore will be oriented generally parallel to the body of the animal when first attachment "E" is utilized to perform a cleaning or grooming task therewith.

A brush E15 is provided for engagement with second housing section E2. Brush E15 comprises a brush plate E15' and a plurality of bristles which extend outwardly from brush plate E15'. Brush plate E15' is positioned between bottom wall E7 of second housing section E2 and an interior surface of comb frame E12. Brush plate E15' is configured to interlockingly engage with a region of the interior surface of comb frame E12 in such a way that and bristles E15" extend through the aperture E13 of comb frame E12 when brush plate E15' is engaged with comb frame E12. As such, tines E14 and bristles E15' are arranged at an angle to one another. In the embodiment where first surface E12' and second surface E12" are arranged at right angles to one another, tines E14 and bristles E15' are arranged at right angles to one another. As will be described later herein, during use of first attachment "E", bristles E15' will be placed in close proximity to an animal's fur and tines E14 will extend outwardly from the head of first attachment "E" pointing in the direction of movement "M" (FIG. 20) of the first attachment "E" along the animal's body.

Referring to FIGS. 10 and 11, comb frame E12 interlockingly engages with bottom wall E7 of second housing section E2 such that comb frame E12 forms the body-contacting surface of the first attachment "E". A release button E16 is provided on the body contacting surface of comb frame E12. If release button E15 is depressed then comb frame E12 separates from bottom wall E7 of second housing section E2. This separation may be desirable if the tines E14 on comb frame E12 become damaged or if the bristles E15" become worn out or the brush becomes too fouled for use. The user may then replace the entire comb frame E12 if the tines E14 are damaged, for example, or may swap out the brush E15 as desired.

Referring to FIGS. 11 and 12, shield E3 is an elongate plate that has a first end E3' and an opposed second end E3". As is evident from FIG. 11, second end E3" is configured as a leg oriented substantially at right angles to a remaining portion of the elongate plate. When shield E3 is engaged between first housing section E1 and second housing section E2, the first end E3' is located proximate first ends E1' and E2' of first and second housings E1, E2, and second end E3" of shield E3 is located proximate second ends E1" and E2" of first and second housings E1, E2. Shield E3 is positioned generally in alignment with the edges of first housing section E1 and second housing section E2 that abut and are joined to one another.

As best seen in FIG. 12, when first housing section E1 and second housing section E2 are engaged with each other about shield E3, a first chamber E17 is defined between first housing section E1 and shield E3, and a second chamber E18 is defined between shield E3 and second housing section E2. First chamber E17 and second chamber E18 extend for substantially the entire length of first attachment "E" beginning proximate first ends E1', E2', E3' and extending to proximate second ends E2", E2", E3".

Referring to FIGS. 11 and 12, a plurality of posts E19 extend upwardly from a surface of shield E3 that faces the interior surface of first housing section E1. Posts E19 extend into first chamber E17. Second end E3" of shield E3 defines an aperture E20 therein. A PCB E21 is mounted on posts E19 of shield E3 and is located in first chamber E17. A power wire E22 extends outwardly from PCB E21, extends through first chamber E17, through the aperture E20 defined in second end E3" of shield E3, and a connector power pin E23 is provided on the terminal end E22' of wire E22. Connector power pin E23 is electrically engaged with a connector shield E24 provided to form part of a trailing end of the first attachment "E". (The trailing end of first attachment "E" is the end of the component that is able to be secured to hose "G".).

FIGS. 11 and 12 further show a shampoo hose E25 extending through first chamber E17 of first attachment "E". A first end E25' of shampoo hose E21 is connected to nozzle E4 of first housing section E1 and a second end E25" of shampoo hose E25 extends through aperture E20 in shield E3. Second end E25" of shampoo hose E25 includes a connector (not numbered) that is configured for connection to hose "G" as will be described later herein. A shampoo squirt button E26 is received within first aperture E5 of first housing section E1 and is electrically coupled to PCB E21. When squirt button E26 is depressed, PCB E21 will cause pump.

When first housing section E1 and second housing section E2 are engaged with one another about shield E3 they form a head E27 and a shaft E28 of the first attachment "E". Head E27 is formed by regions of first and second housings E1 and E2 proximate first ends E1' and E2'. Shaft E28 extends outwardly head E27 and terminates at second ends E1", E2" of first and second housings E1, E2. Head E27 comprises a leading end of the first attachment "E" and shaft E28 comprises a trailing end of the first attachment "E". Head E27 is brought into close proximity to an animal during a grooming procedure. Shaft E28 is configured to be engaged with main unit "A" of device 10 via hose "G" as will be later described herein.

Referring now to FIGS. 13 and 14 there is shown a second attachment "F" for use with device 10. Second attachment "F" is a paw cleaner that may be selectively connected to main unit "A" by hose "G". Paw cleaner "F" comprises a main housing F1 which is generally tubular in shape and includes peripheral wall which bounds and defines an interior chamber F' (FIG. 14). A tubular spray head F2 is configured to be nestingly engaged within the interior chamber F1' of main housing F1. Spray head F2 includes a tubular peripheral wall which bounds and defines an interior cavity F2'. As best seen in FIG. 23, spray head F2 is provided with a plurality of spray nozzles F3 which extend into the interior cavity F2' and are configured to deliver a quantity of fluid into the interior cavity F2' of spray head F2. A gasket F4 extends across an opening to an upper end of the interior cavity F2' of spray head F2. Gasket F4, as illustrated, defines a star-shaped aperture F4' therein. Gasket F4 is retained in place across the opening to interior cavity F2' by a lid ring F5 that is threadably engageable with an upper end of main housing F1. Gasket F4 preferably is fabricated from a flexible material so that a dog's paw may be inserted through the star-shaped aperture F4' defined by gasket F4 and into the interior cavity F3' of spray head F3.

A handle F6 (FIG. 13) is provided on paw cleaner "F". Handle F6 is comprised of a first handle section F6' (FIG. 14) and a second handle section F6" that are substantially identical with each other but are arranged as mirror images of one another. Each handle section F6' and F6" include a cup section F7 and a ring member F8 that are connected to one another by a vertical support F9. Handle sections F6' and F6" are brought into engagement with main housing F1 such that the cup sections F7, F7 are received under a first end of the main housing F1 to form a floor under the main housing F1. The ring members F8, F8 wrap around an upper region of the main housing F1 in a location that causes them to be positioned below lid ring F5. First and second handle sections F6' and F6" are secured to one another any suitable manner such as by heat welding or an adhesive to form a single handle F6.

As best seen in FIGS. 14 and 23, the vertical supports F9, F9 form a hollow handle within which a PCB F10 is located. A power wire F11 extends between PCB F10 and a connector pin F12 which is configured to be electrically coupled to power supplied via hose "G" as will be later described herein. A squirt button F13 is operatively engaged with PCB F10 and is depressible to actuate the remote pump A12 to deliver a quantity of shampoo to paw cleaner "F", as will be described later herein.

As best seen in FIGS. 14 and 23, paw cleaner "F" further includes a shampoo hose F14 that is positioned to be operatively engaged with hose "G" and to be delivered a volume of shampoo therethrough. Shampoo hose F14 is in fluid communication with a fluid channel F15 defined between main housing F1 and spray head F2.

Paw cleaner "F" further comprises a hose collar F16 and an inner collar F17 which are operatively engageable within a region of the cup sections F7, F7 of handle F6. Hose collar F16 and inner collar F17 are interlockingly engaged with one another and with handle F6 via connector pin F12 that passes through aligned holes (not numbered) defined in the components that connect to one another.

Turning now to FIGS. 15 and 16 there is illustrated a wash hose "G" that is connected to main unit "A" and to which the first attachment "E" and second attachment "F" are selectively engageable. Wash hose "G" includes a tubular sleeve G1 that has a first end and a second end, and defines a bore G1' (FIG. 16) that extends between the first and second ends. Wash hose "G" further includes an airline G2, a shampoo line G3, and a power wire G4 that extend between the first and second ends of sleeve G1. The power wire G4 has a power connector G5 at each end.

The main unit connector G6 is engaged with the first end of the sleeve G1 and an attachment connector G7 is engaged with the second end of the sleeve G1. Referring to FIG. 15 it can be seen that main unit connector G6 includes a power connector G5, a shampoo inlet G8, and an air inlet/waste outlet G9. Attachment connector G7 includes a power connector G5, a shampoo outlet G10, and an air outlet/waste inlet G11. A depressible button G7' is provided on attachment connector G7 to be received within a complementary aperture, such as aperture E6 (FIG. 9) on attachment "E". As will be understood, when main unit connector G6 is operatively engaged with the main unit "A", the power connector G5 is electrically coupled with the electrical system of main unit "A". Furthermore, the shampoo inlet G8 is selectively operatively engaged with the pump outlet hose A14 which extends from pump A12 to vacuum port A8. Additionally, the air inlet/waste outlet G9 is operatively engaged with the blower/vacuum motor A15 via blower port A10. When attachment connector G7 is operatively engaged with one of the first attachment "E" and second attachment "F", the power connector G5 is electrically coupled with the electrical system of the connected first or second attachment "E" or "F", the shampoo outlet G10 is operatively engaged with the shampoo hose E25 or F14, and the air outlet/waste inlet G11 is operatively engaged with the second chamber E18 or interior cavity F2' of the associated attachment.

Referring now to FIGS. 17 and 18, there is shown a third attachment "H" for engagement with main unit "A". In particular, the third attachment "H" s configured to form a part of and be selectively engaged with steam delivery system "C". The third attachment "H" is a steamer attachment that comprises a steamer head H1, and a steamer shaft H2. Steamer shaft H2 is configured for selectively engagement with the steamer hose C12.

As shown in FIGS. 17, 18, and 24, steamer head H1 includes a first surface H1' that will be oriented generally parallel to a body of an animal during a grooming or cleaning task. Steamer head H1 further includes a second surface H1" which is oriented at an angle relative to the first surface H1'. In some embodiments, the second surface H1" and the first surface H1' are oriented at right angles to one another. A plurality of tines H3 extend outwardly from the second surface H1" in a direction of movement "M" (FIG. 24) of the steamer attachment along the body of the animal 14 during the grooming or cleaning task. As is readily apparent from FIG. 24, and as will be discussed later herein, the plurality of tines H3 comprise a leading end of the steamer attachment "H" during the grooming or cleaning task. A least one steamer nozzle H4 extends outwardly from a third surface H1''' of the head H1 of the steamer attachment "H". The third surface H1''' is located remote from the body of the animal during the grooming or cleaning task. FIGS. 17 and 18 show a plurality of steamer nozzles H4 provided inwardly of the tines H3.

When steamer attachment "H" is engaged with steamer hose C12, the nozzles H4 are placed in fluid communication with the bore C12' of steamer hose C12 and thereby with interior cavity C6' (FIG. 6) of the steamer tank C6. When steam delivery system "C" is activated via power switch A18 and controls A19, steam is generated in steamer tank C6 as previously described herein. The generated steam travels through the bore C12' of steamer hose C12, through the bore H2' of shaft H2 of steamer attachment "H" and subsequently out of nozzle H4 of steamer attachment "H". This will be further described later herein.

Now that the various components of cleaner device 10 have been described, task of cleaner device 10 by a user 12 in the performance of the grooming of an animal 14 is illustrated and described with reference to FIGS. 19 through 24.

The user 12 will first select what type of grooming task he or she wishes to perform with device 10 and will select to engage the appropriate first attachment "E", second attachment "F", or third attachment "H" with main unit "A". If the first attachment "E" or the second attachment "F" are to be engaged with main unit "A", the user 12 will attach the attachment hose "G" to the main unit "A", selecting the appropriate one of the vacuum port A8 (FIG. 1) or blower port A10. If the user 12 intends shampooing the animal 14, for example, the vacuum port A8 will be selected, the user 12 will pivot the cover A9 to the open position and the main unit connector G6 of attachment hose "G" will be operatively engaged with vacuum port A8. If the user 12 has washed the animal 14, the blower port A10 will be selected, the user 12 will pivot cover A11 to the open position, and the main unit connector G6 will be engaged with the blower port A10. The attachment connector G7 on attachment hose "G" will be engaged with the selected one of the first attachment "E" or the second attachment "F".

FIGS. 19 and 20 show first attachment "E" engaged with attachment hose "G" via attachment connector G7 in order to perform a first grooming task. In particular, FIGS. 19 and 20 illustrate a scenario where the user 12 intends shampooing the animal 14. The main unit connector G6 at the main unit end of the attachment hose "G" is shown engaged with vacuum port A8 (FIG. 4). (The port cover A9 is shown pivoted to the open position.) The arrangement places the bore G9 of hose "G" in fluid communication with the reservoir "B" via vacuum port A8, and places the reservoir "B" in fluid communication with the motor A15 via blower inlet hose A16. Motor A15 is activated via ON-OFF switch A18 and controls A19 to create suction at the head A27 of first attachment "E". The airflow "AF" (FIG. 20) through second chamber E18 of first attachment "E" and through bore G9 of attachment hose "G" which is caused when motor A15 is activated is in a first direction moving from the first attachment "E" towards the main unit "A". The connection of attachment hose "G" to first attachment "E" and vacuum port A8 on main unit "A" also ensures there is fluid communication between the tank D1 of the liquid delivery system, the pump outlet hose A14, the pump A12, the pump inlet hose A13, vacuum port A8, shampoo hose G3 of the attachment hose "G", shampoo hose E25 in first attachment "E", and the nozzle E4 in first attachment "E". When the liquid delivery system is activated by depressing the squirt button E26 on first attachment "E", the cleaning liquid moves in a direction from the tank D1 through the various valves, pipes, pumps, ports, and hoses to the nozzle E4 on first attachment "E" and is squirted out therefrom. The direction is opposite to the direction of the airflow "AF" through the bore G9 of attachment hose "G" and first attachment "E" as shown in FIG. 20.

FIG. 19 shows first attachment "E" oriented so as to position the bristles E15" of brush E15 in close proximity to the fur 14a of the animal. The user 12 will move the power switch A18 on main unit "A" to the "ON" position, will select the appropriate controls A19 to activate the pump A12 and the blower/vacuum motor A15. The user 12 will then moves the first attachment "E" along the fur 14a of the animal 14.

It should be noted that in PRIOR ART devices and methods, grooming tools are typically moved in a direction away from the animal's head and towards the animal's tail and/or away from the animal's back and sides, downwardly towards the surface upon which the animal is standing. This movement of PRIOR ART devices matches the orientation in which the hairs of the animal's fur are oriented, i.e., pointing towards the animal's tail or downwardly towards the ground. The result of moving PRIOR ART grooming tools in this manner, with the direction of natural orientation of the hairs of the animal, is that the hairs tend to be pushed downwardly towards the animal's body and are flattened thereagainst.

In the present device and method by contrast, the grooming tool, i.e., first attachment "E" is moved in a direction away from the animal's tail and towards the animal's head, i.e., in a completely opposite direction to the direction in which the animal's hairs lay. The direction of movement of first attachment "E" is indicated by the arrow "M" in FIGS. 19 and 20. The result of moving the first attachment in the direction "M" is that instead of the hairs of the fur 14a being flattened against the animal's body, the hairs 14a are lifted upwardly away from the body. This is illustrated in FIG. 20. In using first attachment "E", the user 12 will tend to move the head E27 of first attachment "E" upwardly along the animal's back moving in a direction away from the animal's tail and towards the animal's head and/or upwardly along the animal's sides and legs and towards the top of the animal's back. This direction of movement "M" causes the animal's hairs 14a to be lifted from a position where they lay more or less flat against the animal's body to a position where they are lifted upwardly and outwardly and are able to be captured in the gaps (not numbered) between the tines E14.

As the head E27 of first attachment "E" is moved in the direction "M", the user 12 will periodically (or continuously) depress the squirt button E26 on first attachment "E". Depression of squirt button E26 will cause a signal to be sent to pump A12 to activate the same to deliver a quantity of shampoo "S" (FIG. 20) through shampoo hoses A 13", G3, E25, and nozzle E4, and onto the hairs 14a held in position by tines E14. Nozzle E4 gently squirts a mixture of shampoo and water all the way to the skin of the animal. Continued movement of first attachment "E" in the direction "M' will cause the bristles E15" of brush E15 to work the shampoo into the animal's fur 14a.

At substantially the same time, shampoo "S" is being squirted through nozzle E4, blower/vacuum motor A15 will generate vacuum suction "AF" (FIG. 20) via blower outlet hose A17 through the air inlet/waste outlet G9 of hose "G", through second chamber E18 of first attachment "E". The vacuum suction "AF" will cause shampoo, loose hairs 14A, and other debris in the animal's fur to be suctioned through brush E15. Some of the loose hairs 14a will be captured by bristles E15 but some particulate materials and the liquid of the shampoo will be entrained in the airflow "AF" moving through second chamber E18. Any shampoo, loose hairs and other debris entrained in the airflow "AF" and will be moved into the reservoir "B". The airflow "AF" will be filtered by B19 so that any filter particulates and liquids remain in reservoir "B".

It should be noted that the direction of movement of first attachment "E" along the animal's body helps to ensure that shampoo is applied deep into the animal's fur and towards the animal's skin. This helps ensure that a more thorough cleaning of the animal is undertaken. Furthermore because the comb E14 and brush E15 move in opposite directions to the way the animal's fur naturally lays, more loose hairs and debris is able to be entrained in the airflow "AF". Additionally, because the hairs of the fur are lifted upwardly, there is improved removal of liquids (such as shampoo) from the animal's fur.

It will be understood that once the shampooing task has been undertaken, the user 12 is able to switch the main unit connector G6 to the blower port A10 so that the airflow "AF" through the second chamber E18 of the first attachment "E" is reversed. When this occurs, as the first attachment "E" is moved in the direction "M", there is improved blowing of air into the animal's fur and therefore more rapid drying of the animal's fur.

When reservoir "B" is full, an automatic shut-off will be triggered and the blower/vacuum motor A15 and pump A12 will shut down. The user 12 is then able to disengage main unit "A" from reservoir "B" and empty reservoir "B". Even if reservoir "B" is not full, the user 12 may elect to switch off the device 10 and empty reservoir "B". In order to empty the reservoir "B", the locking clips A5 on main unit "A" are moved from a locked condition to an unlocked condition, the main unit "A" is lifted off the lid B2 of reservoir "B", the lid B2 of the reservoir is removed from the tank B1, and the contents of the reservoir "B" are poured out into a drain or other disposal receptacle. Once reservoir "B" is emptied, lid B2 is reengaged with tank B1, main unit "A" is seated once again on lid B2 of reservoir, and locking clips A5 will be moved from the unlocked condition back to the locked condition to secure main unit "A" and reservoir "B" to one another. Device 10 is then ready for its next use.

It will be understood that if the liquid delivery system "D" no longer has sufficient shampoo therein, the user is able to lift the liquid delivery system out of engagement with main unit "A", invert the tank D1 of the liquid delivery system "D", refill the tank D1, and then reengage the tank D1 with the main unit "A".

Referring now to FIGS. 21 through 23, a second grooming task is illustrated utilizing device 10. In particular, the grooming task being performed with device 10 is the cleaning of the animal's paws 14b. In order to perform this second cleaning task, the user 12 will detach first attachment "E" from attachment connector G7, shown in FIGS. 19 and 20, and will attach second attachment "F" with attachment connector G7. Similar to the manner of use of first attachment "E", the user 12 will then decide if they wish to shampoo the animal's paws 14b or blow the animal's paws dry. For example, if it is decide to wash/shampoo the animal's paws, then the main unit connector G6 will be engaged with the vacuum port A8 on main unit "A". If it is decided to blow the animal's paws dry after a previously-performed shampooing task, then the main unit connector G6 will be engaged with the blower port A10.

If, as illustrated in FIG. 23, the user decides to shampoo the animal's paw 14b, they will grasp the paw and insert the same through the star-shaped aperture F4' (FIG. 13) and into the interior cavity F2' of the spray head F2. The user will then activate main unit "A" utilizing the ON-OFF button, i.e., power switch A18 and select the desired grooming task using controls A19. When it is desired to squirt a quantity of shampoo into the interior cavity F2' of spray head F2, the user will depress the squirt button F13 (FIG. 23). This motion will activate the pump A12 and cause a quantity of shampoo to travel from liquid delivery system "D", through pump inlet hose A13, through pump A12, through pump outlet hose A14 to vacuum port A3, then through shampoo line G3 in hose "G", and finally through shampoo hose F14 of second attachment "F". The shampoo will be sprayed "S" out of the nozzles F3 and into the interior cavity of spray head F2 and onto the animal's paw 14b. At the same time, blower/vacuum motor A15 is activated and causes vacuum suction to be generated in the attachment hose "G" and thereby in the cup sections F7 that form the base of the second attachment "F". Shampoo, liquid, loose hairs, and other particulate debris will be suctions off the animal's paw 14b, thereby cleaning the same.

If the user subsequently wishes to dry the animal's paw, he or she will simply detach the main unit connector G6 from the vacuum port A8 and reengage the main unit connector G6 with the blower port A10. A reverse airflow "AF" will be set up through hose "G" and air will blow into the interior cavity F2' of the second attachment "F". In particular, air will blow through the hose "G" and into the cup sections engaged with the hose "G" and blow dry the animal's paw. The user will then remove the animal's first paw from second attachment "F" and will insert their second paw 14b, then the third paw and finally the fourth paw 14b.

Once again, when the shampooing task occurs, the waste water with entrained shampoo, particulates, and loose hairs will flow from the hose "G" into the reservoir "B". When the reservoir "B" is full or it is desired to empty the reservoir even when not full, the main unit "A" will be detached from the reservoir "B", the lid of the reservoir will be removed, and the contents of the reservoir will be poured out into a drain or other disposal receptacle.

Referring now to FIG. 24, a grooming task is illustrated in which the steam delivery system "C" is used. FIGS. 17 and 18 show that the third attachment "H" is operatively engaged with the steamer hose C12 which extends outwardly from steam delivery system "C" located on main unit "A". When it is desired to utilize steam delivery system "C", the user will activate the same utilizing the "ON-OFF" power switch A18 and controls A19. As described earlier herein, when steam delivery system "C" is activated, the liquid within the tank C6 is heated by the heating element C3 and hotplate C5 to the point that steam is generated and flows into the steamer hose C12. The steam flows through from the bore C12' of steamer hose C12 into the bore H2' of third attachment "H" as indicated by the arrow "AF", and then into the interior of the head H1 of the third attachment "H". The steam will flow out of head H1 through the nozzles H4 thereon. FIG. 24 shows that third attachment "H" is moved along the animal's body in a similar manner to the way that first attachment "E" is moved therealong. In particular, third attachment "H" is moved in the direction indicated by arrow "M" away from the animal's tail and towards the animal's head (or in a direction away from the animal's paws to the top of the animal's back). The hairs 14a of the animal's fur get lifted upwardly and are moved in the direction of arrow "M" as they are caught in the tines H3 of the third attachment "H". A steam cloud "SC" will be emitted from nozzles H4 and will contact the hairs 14a of the animal, cleaning the same. It should be noted that because of the orientation of the head H1 of third attachment "H", steam is not directed downwardly towards the animal's skin but is instead emitted in a direction outwardly away from the animal's skin. This arrangement helps to ensure that it is less likely the animal may be accidentally burned by the steam. Additionally, because the hairs 14a are being gathered and lifted by tines H3, substantially the entire length of the various hairs are contacted by the steam and are cleaned thereby.

In summary, a method of grooming or cleaning an animal with device 10 includes selecting one of washing the animal's fur and steaming the animal's fur; individually activating a liquid delivery system on a device if the selection involves washing the animal's fur; and individually activating a steam delivery system on the device if the selection involves steaming the animals fur. If washing the animal's fur is selected, then the user will engage the attachment hose "G" to main unit "A" of the device 10. In particular, attachment hose "G" will be engaged with the vacuum port A8 on main unit "A" and one of the first attachment "E" and the second attachment "F" will be engaged with the free end of attachment hose "G". First attachment "E" will be selected if the animal's fur is to be cleaned by washing, and second attachment "F" will be selected if the animal's paws are to be cleaned by washing. Engaging attachment hose "G" with vacuum port A8 places the attachment hose "G" in fluid communication with the tank D1, pump A12, and blower/vacuum motor A15.

If the first attachment "E" is selected for engagement with attachment hose "G", during the washing operation the method includes placing a first surface e12' of the head E27 in close proximity to the animal's body; moving the head E27 in a direction "M" away from the animal's tail and towards the animal's head (or away from the animal's paws towards a top of the animal's back); extending a plurality of tines E14 outwardly from a second surface E12" of the head E27 of the first attachment "E" in the direction of movement "M" of the head E27 along the animal's body. The second surface E12" is oriented at an angle to the first surface E12', and wherein the tines E14 form a leading end of the head E27 as the head E27 is moved along the animal's body. As the head E27 is moved in the direction "M", and as illustrated in FIG. 20, hairs 14a' of the animal's fur are captured between adjacent tines of the plurality of tines E14; lifting the captured hairs 14a' away from the animal's body as the head E27 is moved therealong. A spray "S" (FIG. 20) of cleaning liquid is delivering from nozzle E4 onto to the captured and lifted hairs 14a', thereby cleaning the same. The method further includes working the cleaning liquid into the animal's fur 14a and skin with bristles E15' of brush E15 extending outwardly from the first surface E12' of the head. The method further comprises generating airflow "AF" in the second chamber E18 of the first attachment "E" with the blower/vacuum motor A15 that is in fluid communication with the first attachment "E". The method includes vacuuming waste cleaning liquid, loose hairs and particulate materials from the animal's fur in the airflow "AF" as it moves through an aperture E11 (FIG. 11) defined in the first surface E12' of the head E27. The method includes transporting the waste cleaning liquid, loose hairs and particulate materials in the airflow "AF" through the attachment hose "G" and into reservoir "G" provided on the device 10. The attachment hose "G" may subsequently be disengaged from vacuum port A8 and be reconnected to the blower port A10 that is in fluid communication with blower/vacuum motor A15. When this occurs, the airflow "AF" through hose "G" and first attachment "E" will be reversed and air will be blown out of the aperture E11 in head E27 of first attachment "E" and may be used to dry the previously cleaned hairs 14a' of the animal's fur. As with the washing operation, the drying operation involves placing the first surface E12' of head E27 proximate the animal's body, extending the plurality of tines E14 in the direction of movement "M" of the first attachment "E" along the body, capturing hairs 14*a*' between adjacent tines E14, thereby lifting the hairs 14*a*' away from the animal's skin, and blowing the captured and lifted hairs 14*a*' dry with the reversed airflow "AF" emitted from head E27. Because the hairs 14*a*' are captured and lifted during both the washing task and the drying task, a more thorough and rapid cleaning and drying of the animal's fur is possible.

If the user selects to steam the animal's fur instead of washing the same, the method includes engaging steamer hose C12 to steamer tank C6 on the main unit "A" of the device 10. The method further includes placing steamer attachment "H" on an end of the steamer hose C12 remote from the steamer tank C6; heating a quantity of water within the steamer tank C6 (with the heating system that includes heater element C3 and hotplate C5), generating steam within steamer tank C6; and delivering the generated steam to the animal's fur through the steamer attachment "H". As shown in FIG. 24, steamer attachment "H" includes a head H1 with a first surface H1' that is placed in close proximity to the animal's body, the steamer attachment "H" is moved in a direction "M" away from the animal's tail and towards the animal's head or away from the animal's paws towards a top of the animal's back. The plurality of tines H3 on head H1 extend outwardly from second surface H1" of the head H1 of the steamer attachment "H" in the direction of movement "M" of the head along the animal's body. As has been discussed earlier herein, second surface H1" of the head H1 is oriented at an angle to the first surface H1' thereof and the tines H3 form a leading end of the head H1 as the head is moved along the animal's body. The method further comprises capturing hairs 14*a*' of the animal's fur between adjacent tines H3 of the plurality of tines H3, lifting the captured hairs 14*a*' away from the animal's body as the head H1 is moved therealong in the direction "M"; and delivering the quantity of steam "SC" to the captured and lifted hairs 14*a*' from at least one nozzle H4 extending upwardly and outwardly away from a third surface H1''' of the head H1 and thereby outwardly away from the animal's body.

As described herein, aspects of the present disclosure may include one or more electrical, pneumatic, hydraulic, or other similar secondary components and/or systems therein. The present disclosure is therefore contemplated and will be understood to include any necessary task components thereof. For example, electrical components will be understood to include any suitable and necessary wiring, fuses, or the like for normal task thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or task in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A device for grooming or cleaning the fur of an animal, wherein the device comprises:

a main unit;

a steam delivery system operatively engaged with the main unit and adapted to selectively deliver a quantity of steam to the animal's fur, wherein the steam delivery system comprises: a steamer tank detachably engageable from the main unit and adapted to hold a quantity of liquid for delivering the quantity of steam, and a steamer hose extending outwardly from the steamer tank; and a liquid delivery system operatively engaged with the main unit and adapted to selectively deliver a volume of liquid to the animal's fur, wherein the liquid delivery system comprises: a cleaning liquid tank detachably engageable from the main unit and adapted to hold a quantity of cleaning liquid therein seperate and independently from the steamer tank and free from being in fluid communication with said steamer tank, and an attachment hose operatively engageable with the main unit and selectively placeable in fluid communication with the cleaning liquid tank; and a steamer attachment of the steam delivery system provided at an end of the steamer hose remote from the steamer tank; the steamer attachment having:

a first surface adapted to be oriented generally parallel to a body of the animal during the grooming or cleaning task;

a second surface oriented at an angle to the first surface;

a plurality of tines extending outwardly from the second surface in a direction of movement of the steamer attachment along the body of the animal during the grooming or cleaning task, wherein the plurality of tines comprise a leading end of the steamer attachment;

at least one nozzle extending outwardly from a third surface of the steamer attachment, wherein the third surface is located remote from the body of the animal during the grooming or cleaning task; and a brush extend outwardly from the first surface in a direction orthogonal to the movement of the steamer attachment along the body of the animal during the grooming or cleaning task;

wherein the steam delivery system and the liquid delivery system are selectively independently activated to perform a grooming or cleaning task with the device.

2. The device according to claim 1, further comprising an extraction system operatively engaged with the main unit and adapted to move waste liquid and solid materials away from a body of the animal during the grooming or cleaning task; wherein the extraction system comprises at least a reservoir provided on the main unit.

3. The device according to claim 2, wherein the attachment hose is selectively placed in fluid communication with the reservoir to deliver the waste liquid and solid materials to the reservoir.

4. The device according to claim 3, wherein the extraction system further comprises a blower/vacuum motor housed within the main unit; and wherein the attachment hose is selectively placed in fluid communication with the blower/vacuum motor.

5. The device according to claim 4, wherein the main unit includes a vacuum port and a blower port which are each in fluid communication with the blower/vacuum motor, wherein the attachment hose is selectively engageable with the vacuum port to cause air flow in a first direction through the attachment hose; and the attachment hose is selectively engageable with the blower port to cause air flow in a second direction through the attachment hose.

6. A device for grooming or cleaning the fur of an animal, wherein the device comprises:

a main unit;

a steam delivery system operatively engaged with the main unit and adapted to selectively deliver a quantity of steam to the animal's fur;

a liquid delivery system operatively engaged with the main unit and adapted to selectively deliver a volume of liquid to the animal's fur, wherein the liquid delivery system comprises: a cleaning liquid tank provided on the main unit and adapted to hold a quantity of cleaning liquid therein, and an attachment hose operatively engageable with the main unit and selectively placeable in fluid communication with the cleaning liquid tank;

wherein the steam delivery system and the liquid delivery system are selectively independently activated to perform a grooming or cleaning task with the device;

wherein the steam delivery system comprises:

a steamer tank provided on the main unit and adapted to hold a volume of water therein seperate and independently from the cleaning liquid tank and free from being in fluid communication with said steamer tank;

a steamer hose extending outwardly from the steamer tank; and a steamer attachment provided at an end of the steamer hose remote from the steamer tank; the steamer attachment having:

a first surface adapted to be oriented generally parallel to a body of the animal during the grooming or cleaning task;

a second surface oriented at an angle to the first surface;

a plurality of tines extending outwardly from the second surface in a direction of movement of the steamer attachment along the body of the animal during the grooming or cleaning task, wherein the plurality of tines comprise a leading end of the steamer attachment;

at least one nozzle extending outwardly from a third surface of the steamer attachment, wherein the third surface is located remote from the body of the animal during the grooming or cleaning task; and a brush extend outwardly from the first surface in a direction orthogonal to the movement of the steamer attachment along the body of the animal during the grooming or cleaning task; and a heating system in operative engagement with the steamer tank and adapted to heat the volume of water in the steamer tank and generate steam therefrom, wherein the heating system comprises at least a heater element wherein the heater element couples to a power connector.

7. A device for grooming or cleaning the fur of an animal, wherein the device comprises:

a main unit;

a steam delivery system operatively engaged with the main unit and adapted to selectively deliver a quantity of steam to the animal's fur, wherein the steam delivery system comprises: a steamer hose extending outwardly from a steamer tank that is adapted to hold a quantity of liquid for delivering the quantity of steam, and a steamer attachment provided at an end of the steamer hose remote from the steamer tank; the steamer attachment having;

a first surface adapted to be oriented generally parallel to a body of the animal during the grooming or cleaning task;

a second surface oriented at an angle to the first surface;

a plurality of tines extending outwardly from the second surface in a direction of movement of the steamer attachment along the body of the animal during the grooming or cleaning task, wherein the plurality of tines comprise a leading end of the steamer attachment;

at least one nozzle extending outwardly from a third surface of the steamer attachment, wherein the third surface is located remote from the body of the animal during the grooming or cleaning task; and a brush extend outwardly from the first surface in a direction orthogonal to the movement of the steamer attachment along the body of the animal during the grooming or cleaning task; and a liquid delivery system operatively engaged with the main unit and adapted to selectively deliver a volume of liquid to the animal's fur;

wherein the steam delivery system and the liquid delivery system are selectively independently activated to perform a grooming or cleaning task with the device;

wherein the liquid delivery system includes:

a cleaning liquid tank provided on the main unit and adapted to hold a quantity of cleaning liquid therein seperate and independently from the steamer tank and free from being in fluid communication with said steamer tank; and an attachment hose operatively engageable with the main unit and selectively placeable in fluid communication with the cleaning liquid tank.

8. The device according to claim 7, wherein the liquid delivery system further comprises a pump that is in fluid communication with the cleaning liquid tank and wherein the attachment hose is selectively placed in fluid communication with the pump.

9. The device according to claim 7, further comprising at least one attachment selectively operatively engageable with an end of the attachment hose remote from the main unit.

10. A grooming device comprising:

a main unit;

a steam delivery system operatively engaged with the main unit, wherein the steam delivery system comprises: a steamer tank detachably engageable from the main unit and adapted to hold a volume of water for delivering a quantity of steam, a steamer hose extending outwardly from the steamer tank; and a steamer attachment provided at an end of the steamer hose remote from the steamer tank; the steamer attachment having:

a first surface adapted to be oriented generally parallel to a body of the animal during the grooming or cleaning task;

a second surface oriented at an angle to the first surface;

a plurality of tines extending outwardly from the second surface in a direction of movement of the steamer attachment along the body of the animal during the grooming or cleaning task, wherein the plurality of tines comprise a leading end of the steamer attachment;

at least one nozzle extending outwardly from a third surface of the steamer attachment, wherein the third surface is located remote from the body of the animal during the grooming or cleaning task; and a brush extend outwardly from the first surface in a direction orthogonal to the movement of the steamer attachment along the body of the animal during the grooming or cleaning task; and a liquid delivery system operatively engaged with the main unit, wherein the liquid delivery system comprises: a cleaning liquid tank detachably engageable from the main unit and adapted to hold a quantity of cleaning liquid therein seperate and independently from the steamer tank and free from being in fluid communication with said steamer tank; and an attachment hose operatively engageable with the main unit and selectively placeable in fluid communication with the cleaning liquid tank;

wherein the steam delivery system and the liquid delivery system are selectively independently activated to perform a grooming or cleaning task with the device.

11. The device according to claim 10, further comprising a grooming attachment operatively engaged with the steam delivery system, wherein the steam delivery system is operable to deliver the quantity of steam to the grooming attachment.

12. The device according to claim 10, further comprising a grooming attachment operatively engaged with the liquid delivery system, wherein the liquid delivery system is operable to deliver a volume of liquid to the attachment.

13. The device according to claim 10, wherein the steam delivery system further comprises a heating system in operative engagement with the steamer tank and adapted to heat the volume of water in the steamer tank and generate steam therefrom, wherein the heating system comprises at least a heater element wherein the heater element couples to a power connector.

14. The device according to claim 10, wherein the liquid delivery system includes a pump and an attachment hose wherein the attachment hose places the pump in fluid communication with the cleaning liquid tank of the liquid delivery system on the main unit.

* * * * *